(12) United States Patent
Hirakawa et al.

(10) Patent No.: US 10,242,271 B2
(45) Date of Patent: Mar. 26, 2019

(54) FACILITY USE MEASURING DEVICE AND FACILITY USE MEASURING SYSTEM

(71) Applicant: PANASONIC INTELLECTUAL PROPERTY MANAGEMENT CO., LTD., Osaka (JP)

(72) Inventors: Kunio Hirakawa, Kanagawa (JP); Yuichi Nakahata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/535,230

(22) PCT Filed: Dec. 11, 2015

(86) PCT No.: PCT/JP2015/006191
§ 371 (c)(1),
(2) Date: Jun. 12, 2017

(87) PCT Pub. No.: WO2016/103614
PCT Pub. Date: Jun. 30, 2016

(65) Prior Publication Data
US 2017/0344834 A1 Nov. 30, 2017

(30) Foreign Application Priority Data
Dec. 25, 2014 (JP) ................................. 2014-262638

(51) Int. Cl.
*G06K 9/00* (2006.01)
*G06Q 50/10* (2012.01)
(Continued)

(52) U.S. Cl.
CPC ....... *G06K 9/00771* (2013.01); *G06K 9/6212* (2013.01); *G06K 9/6215* (2013.01);
(Continued)

(58) Field of Classification Search
CPC combination set(s) only.
See application file for complete search history.

(56) References Cited

U.S. PATENT DOCUMENTS

| 2011/0293148 A1* | 12/2011 | Kobayashi | ......... G06K 9/00778 |
| | | | 382/107 |
| 2014/0347479 A1* | 11/2014 | Givon | ................ G06K 9/00342 |
| | | | 348/143 |

FOREIGN PATENT DOCUMENTS

| JP | 4198951 | 10/2008 |
| JP | 4506381 | 5/2010 |

OTHER PUBLICATIONS

International Search Report, dated Feb. 16, 2016 by the Japan Patent Office (JPO), in corresponding International Application No. PCT/JP2015/006191.

* cited by examiner

*Primary Examiner* — Alex Kok S Liew
(74) *Attorney, Agent, or Firm* — Greenblum & Bernstein, P.L.C.

(57) ABSTRACT

A facility use measuring device includes a processor and a memory storing instructions. The processor is configured to set a plurality of staying areas for determining the presence or absence of stay of users on images, to generate stay information relating to the presence or absence of stay of the users for each of the staying areas based on a change situation, to compare pieces of stay information for every at least two staying areas and determine a group configuration regarding the users who respectively stay in the staying areas based on similarity of the pieces of stay information, to generate use information relating a use situation of a facility according to the group configuration, based on the pieces of stay information for each of the staying areas and a determination result of the group configuration, and to (Continued)

generate display information displaying the use information and output the display information.

10 Claims, 16 Drawing Sheets

(51) Int. Cl.
*G06K 9/62* (2006.01)
*G06K 9/78* (2006.01)
G06Q 30/02 (2012.01)

(52) U.S. Cl.
CPC ............. *G06K 9/6267* (2013.01); *G06K 9/78* (2013.01); *G06Q 50/10* (2013.01); *G06Q 30/0205* (2013.01)

FIG. 5A

IMAGE CHANGE RATE (PARTS PER TEN THOUSAND)

| TIME / STAYING AREA | 6:37 | 6:38 | 6:39 | 6:40 | 6:41 | 6:42 | 6:43 | 6:44 | 6:45 | 6:46 | 6:47 | 6:48 | 6:49 | 6:50 | 6:51 | 6:52 | 6:53 | 6:54 | 6:55 | 6:56 | 6:57 | 6:58 | 6:59 | 7:00 |
|---|---|---|---|---|---|---|---|---|---|---|---|---|---|---|---|---|---|---|---|---|---|---|---|---|
| A1 | 11 | 955 | 2283 | 1682 | 1610 | 1564 | 2453 | 2466 | 2661 | 2322 | 2477 | 2399 | 1858 | 1889 | 1573 | 2144 | 40 | 24 | 27 | 36 | 41 | 20 | 35 | 32 |
| A2 | 92 | 70 | 165 | 120 | 618 | 129 | 180 | 121 | 117 | 128 | 3445 | 1179 | 2666 | 2694 | 2256 | 3165 | 1391 | 1293 | 995 | 1500 | 921 | 104 | 83 | 103 |
| A3 | 34 | 33 | 18 | 20 | 1083 | 2902 | 2053 | 1893 | 1816 | 1622 | 1820 | 1389 | 2500 | 1867 | 1704 | 1579 | 1676 | 1587 | 1815 | 1529 | 771 | 623 | 608 | 436 |
| A4 | 117 | 306 | 2951 | 2612 | 3284 | 2928 | 3248 | 3037 | 2781 | 3254 | 2922 | 2641 | 3204 | 3670 | 1085 | 1620 | 2058 | 2557 | 2799 | 1987 | 3370 | 2305 | 3065 | 113 |
| A5 | 762 | 462 | 288 | 393 | 557 | 310 | 366 | 610 | 2560 | 3392 | 4689 | 581 | 521 | 888 | 323 | 335 | 279 | 272 | 265 | 332 | 296 | 362 | 326 | 281 |
| A6 | 5159 | 4610 | 3827 | 2909 | 4516 | 2356 | 1980 | 3722 | 3731 | 3025 | 2717 | 2123 | 4377 | 5240 | 195 | 138 | 138 | 169 | 152 | 191 | 112 | 85 | 112 | 118 |

*FIG. 5B*

| TIME / STAYING AREA | 6:37 | 6:38 | 6:39 | 6:40 | 6:41 | 6:42 | 6:43 | 6:44 | 6:45 | 6:46 | 6:47 | 6:48 | 6:49 | 6:50 | 6:51 | 6:52 | 6:53 | 6:54 | 6:55 | 6:56 | 6:57 | 6:58 | 6:59 | 7:00 |
|---|---|---|---|---|---|---|---|---|---|---|---|---|---|---|---|---|---|---|---|---|---|---|---|---|
| A1 | 0 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| A2 | 0 | 0 | 0 | 0 | 0 | 0 | 0 | 0 | 0 | 0 | 1 | 1 | 1 | 1 | 1 | 1 | 1 | 1 | 1 | 1 | 1 | 0 | 0 | 0 |
| A3 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 |
| A4 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| A5 | 0 | 0 | 0 | 0 | 0 | 0 | 0 | 0 | 0 | 0 | 1 | 0 | 0 | 1 | 0 | 0 | 0 | 0 | 0 | 0 | 0 | 0 | 0 | 0 |
| A6 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 |

STAY DETERMINATION RESULT DATA

1: BEING SEATED, 0: BEING NON-SEATED

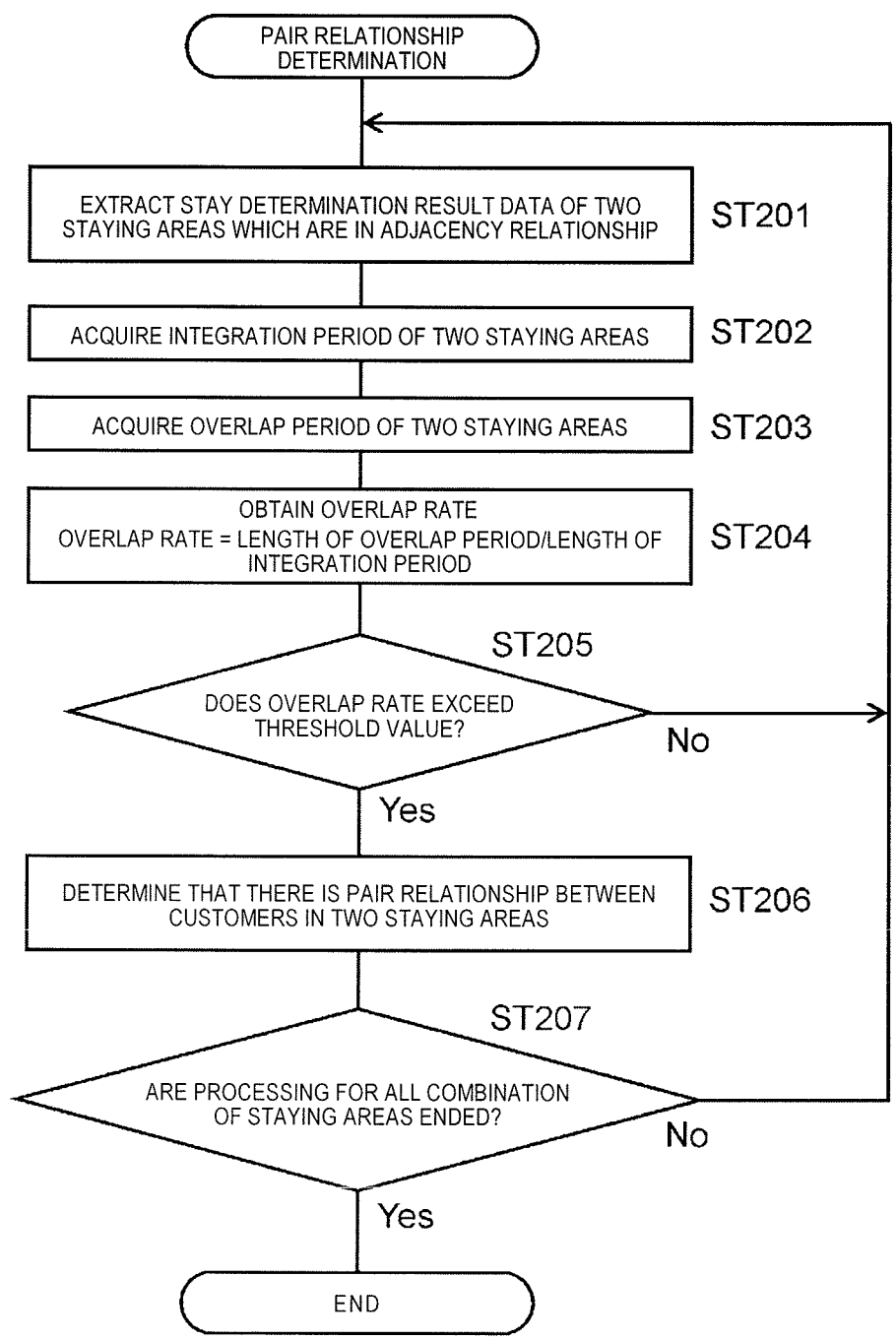

FIG. 11A

NUMBER OF SETS OF PAIRS

| DAY OF WEEK | SUNDAY | MONDAY | TUESDAY | WEDNESDAY | THURSDAY | FRIDAY | SATURDAY |
|---|---|---|---|---|---|---|---|
| DATE | JUNE 1 | JUNE 2 | JUNE 3 | JUNE 4 | JUNE 5 | JUNE 6 | JUNE 7 |
| NUMBER OF SETS OF PAIRS | 17 | 19 | 10 | 14 | 18 | 14 | 15 |
| DATE | JUNE 8 | JUNE 9 | JUNE 10 | JUNE 11 | JUNE 12 | JUNE 13 | JUNE 14 |
| NUMBER OF SETS OF PAIRS | 13 | 12 | 12 | 13 | 20 | 11 | 17 |
| DATE | JUNE 15 | JUNE 16 | JUNE 17 | JUNE 18 | JUNE 19 | JUNE 20 | JUNE 21 |
| NUMBER OF SETS OF PAIRS | 16 | 17 | 18 | 19 | 20 | 18 | 20 |
| DATE | JUNE 22 | JUNE 23 | JUNE 24 | JUNE 25 | JUNE 26 | JUNE 27 | JUNE 28 |
| NUMBER OF SETS OF PAIRS | 18 | 15 | 11 | 8 | 17 | 19 | 20 |
| DATE | JUNE 29 | JUNE 30 | | | | | |
| NUMBER OF SETS OF PAIRS | 15 | 13 | | | | | |
| AVERAGE PER DAY OF WEEK | 15.8 | 15.2 | 10.2 | 13.5 | 18.7 | 15.5 | 18 |

FIG. 11B

RATE OF BEING SEATED IN PAIR

| DAY OF WEEK | SUNDAY | MONDAY | TUESDAY | WEDNESDAY | THURSDAY | FRIDAY | SATURDAY |
|---|---|---|---|---|---|---|---|
| DATE | JUNE 1 | JUNE 2 | JUNE 3 | JUNE 4 | JUNE 5 | JUNE 6 | JUNE 7 |
| RATE OF BEING SEATED IN PAIR | 42.9% | 45.2% | 30.3% | 36.3% | 46.4% | 32.9% | 34.9% |
| DATE | JUNE 8 | JUNE 9 | JUNE 10 | JUNE 11 | JUNE 12 | JUNE 13 | JUNE 14 |
| RATE OF BEING SEATED IN PAIR | 21.90% | 25.50% | 26.60% | 35.60% | 35% | 27.40% | 36% |
| DATE | JUNE 15 | JUNE 16 | JUNE 17 | JUNE 18 | JUNE 19 | JUNE 20 | JUNE 21 |
| RATE OF BEING SEATED IN PAIR | 36.2% | 38.4% | 35.6% | 44.6% | 38.4% | 32.1% | 40.7% |
| DATE | JUNE 22 | JUNE 23 | JUNE 24 | JUNE 25 | JUNE 26 | JUNE 27 | JUNE 28 |
| RATE OF BEING SEATED IN PAIR | 41.0% | 28.3% | 21.9% | 20.5% | 31.6% | 33.9% | 37.1% |
| DATE | JUNE 29 | JUNE 30 | | | | | |
| RATE OF BEING SEATED IN PAIR | 34.0% | 28.7% | | | | | |

FIG. 11C

RATIO OF TIME PERIOD OF BEING SEATED

| DAY OF WEEK | SUNDAY | MONDAY | TUESDAY | WEDNESDAY | THURSDAY | FRIDAY | SATURDAY |
|---|---|---|---|---|---|---|---|
| DATE | JUNE 1 | JUNE 2 | JUNE 3 | JUNE 4 | JUNE 5 | JUNE 6 | JUNE 7 |
| RATIO OF TIME PERIOD OF BEING SEATED | 36.8% | 28.0% | 24.5% | 27.9% | 34.5% | 29.1% | 36.2% |
| DATE | JUNE 8 | JUNE 9 | JUNE 10 | JUNE 11 | JUNE 12 | JUNE 13 | JUNE 14 |
| RATIO OF TIME PERIOD OF BEING SEATED | 27.1% | 26.8% | 26.8% | 33.6% | 32.2% | 40.1% | 32.1% |
| DATE | JUNE 15 | JUNE 16 | JUNE 17 | JUNE 18 | JUNE 19 | JUNE 20 | JUNE 21 |
| RATIO OF TIME PERIOD OF BEING SEATED | 28.7% | 28.9% | 30.7% | 35.8% | 36.5% | 35.1% | 33.8% |
| DATE | JUNE 22 | JUNE 23 | JUNE 24 | JUNE 25 | JUNE 26 | JUNE 27 | JUNE 28 |
| RATIO OF TIME PERIOD OF BEING SEATED | 36.8% | 29.5% | 27.1% | 30.1% | 35.5% | 38.0% | 34.5% |
| DATE | JUNE 29 | JUNE 30 | | | | | |
| RATIO OF TIME PERIOD OF BEING SEATED | 31.3% | 33.3% | | | | | |

FACILITY USE MEASURING DEVICE AND
FACILITY USE MEASURING SYSTEM

TECHNICAL FIELD

The present invention relates to a facility use measuring device and a facility use measuring system that determine a group configuration of users based on images obtained by photographing inside the facility and measure a use situation of the facility according to the group configuration.

BACKGROUND ART

A monitoring system in which a camera to photograph inside of a store is installed and a situation inside the store is monitored using images of the camera has been widely distributed in an eating and drinking place such as a restaurant and a coffee shop. It is possible to grasp a situation of customers who visited the store using the images of the camera, particularly, a group configuration of the customers, that is, whether the customers visited the store in a single person, whether the customers visited the store in a group, or how many customers visited the store in a case where the customers visited the store in a group. A store operator can consider, for example, improvements for efficiently operating the store, such as change of a layout of tables or seats based on the pieces of information, and it is useful for improving sales and profits of the store.

As matters related to a technique for grasping such a group configuration of persons, conventionally, a technique in which a distance between persons is obtained from an image in which a plurality of persons are photographed and a group configuration of persons is determined based on the distance is known (see PTL 1 and PTL 2).

CITATION LIST

Patent Literature

PTL 1: Japanese Patent No. 4198951
PTL 2: Japanese Patent No. 4506381

SUMMARY OF THE INVENTION

According to the present invention, there is provided a facility use measuring device and a facility use measuring system capable of accurately determining a group configuration of users in a facility in which positions where the users stay are determined in advance.

A facility use measuring device of the present invention determines a group configuration of users based on images obtained by photographing inside of a facility and measures a use situation of the facility according to the group configuration. The facility use measuring device includes a processor and a memory storing instructions. The processor executes the following matters as the instructions stored in the memory. The processor is configured to set a plurality of staying areas for determining the presence or absence of stay of the users on each of the images. Next, the processor is configured to generate stay information relating to the presence or absence of stay of the users for each of the staying areas based on a change situation of each of the images in the staying areas. The processor is configured to compare pieces of stay information for every at least two staying areas and determine a group configuration regarding the users who respectively stay in the staying areas based on similarity of the pieces of stay information. The processor is configured to generate use information relating to a use situation of the facility according to the group configuration, based on the stay information for each of the staying areas and a determination result of the group configuration. Furthermore, the processor is configured to generate display information displaying the use information and output the display information.

A facility use measuring system of the present invention determines a group configuration of users based on images obtained by photographing inside of a facility and measures a use situation of the facility according to the group configuration. The facility use measuring system includes a camera for photographing inside the facility and a plurality of information processing devices each of which includes a processor and a memory storing instructions. Any one of the plurality of information processing devices executes the following matters as instructions stored in the memory by the processor. The information processing device sets a plurality of staying areas for determining the presence or absence of stay of the users on each of the images. Next, the information processing device generates stay information relating to the presence or absence of stay of the users for each of the staying areas based on a change situation of each of the images in the staying areas. The information processing device compares the pieces of stay information for every at least two staying areas and determines a group configuration regarding the users who respectively stay in the staying areas based on similarity of pieces of the stay information. The information processing device generates use information relating to the use situation of the facility according to the group configuration, based on the piece of stay information for each staying area and a determination result of the group configuration. Furthermore, the information processing device generates display information displaying the use information and outputs the display information.

According to the present invention, a group configuration of users are determined based on similarity of stay information of each staying area and thus, it is possible to accurately determine the group configuration of users in a facility in which positions where the users stay are determined in advance.

BRIEF DESCRIPTION OF DRAWINGS

FIG. 5A is an explanatory diagram illustrating an example of an image change rate used for pair relationship determination.

FIG. 5B is an explanatory diagram illustrating an example of stay determination result data used for the pair relationship determination.

FIG. 9 is a flowchart illustrating a procedure of a process performed by group configuration determinator 23.

FIG. 11A is an explanatory diagram illustrating the number of sets of pairs as an example of a measurement result report output from monitor 7 or printer 8.

FIG. 11B is an explanatory diagram illustrating a rate of being seated in pair as another example of the measurement result report output from monitor 7 or printer 8.

FIG. 11C is an explanatory diagram illustrating a ratio of time period of being seated as another example of the measurement result report output from monitor 7 or printer 8.

DESCRIPTION OF EMBODIMENT

Prior to description of an embodiment of the present invention, problems in the related art will be briefly described. In the related art, a group configuration is determined by a distance between persons. For that reason, as in walking, in a situation where a positional relationship between persons is not significantly restricted, group configuration determination may be carried out in a corresponding accuracy. However, as in an eating and drinking place, in a situation where seats are arranged at predetermined distances, when persons are seated on the seat, it is unable to properly determine the group configuration by a distance between persons. When an image obtained by photographing a person who enters a store from the entrance of the store is used, it is possible to determine the group configuration also in the related art. However, it is unable to properly determine the group configuration under a congested situation and it is difficult to apply the conventional technique to an eating and drinking place.

Hereinafter, the embodiment of the present invention will be described with reference to the accompanying drawings.

Figure 1:
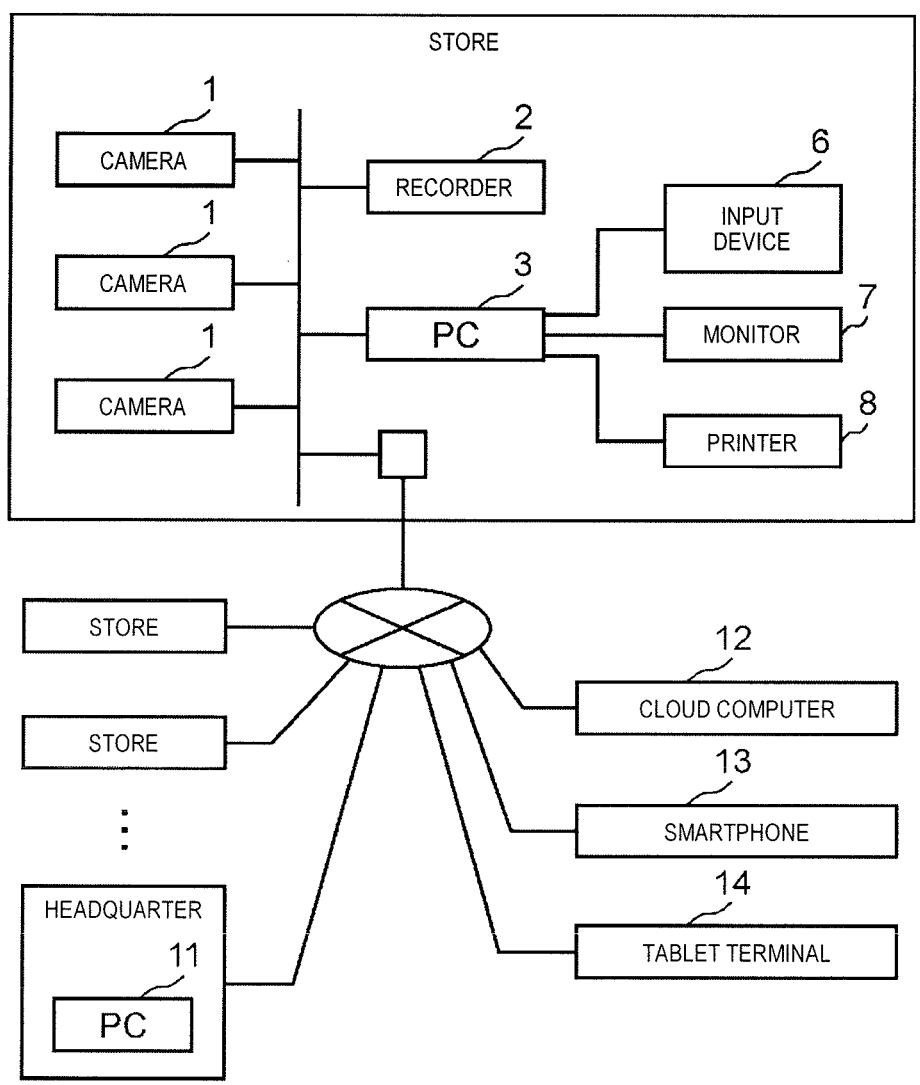
FIG. 1 is a diagram illustrating an entire configuration of a facility use measuring system according to the present embodiment.

FIG. 1 is a diagram illustrating an entire configuration of a facility use measuring system according to the present embodiment. The facility use measuring system is intended to be built to target an eating and drinking place such as a restaurant and a coffee shop and includes camera 1, recorder (image accumulation device) 2, and PC (personal computer; facility use measuring device) 3.

Camera 1 is installed in the right place in the store (facility), an image inside the store is imaged by camera 1 and a resulting image obtained by image-capturing is accumulated in recorder 2.

Input device 6 such as a mouse used for various input operations to be performed by a user such as a store manager, monitor (display device) 7 displaying a monitoring screen, and printer 8 are connected to PC 3. PC 3 is installed in the right place in the store, the user can browse an image inside the store photographed by camera 1 in real time by the monitoring screen displayed on monitor 7, and can browse the image inside the store of the past recorded by recorder 2. PCs 3 and 11 include a processor (CPU) and a program memory. The CPU of PC 3 is realized by causing programs (instructions) for monitoring to be executed. These programs may be provided to the user by being recorded into a suitable program recording medium as an application program that runs on a general OS (operating system) or through a network, in addition to configuring the programs as a dedicated device by being introduced into PC 3 as an information processing device in advance.

Camera 1, recorder 2, and PC 3 are installed in each of a plurality of stores, PC 11 is installed in a headquarter that directs a plurality of stores, the image inside the store photographed by camera 1 can be browsed in PC 11 in real time, and an image inside the store of the past recorded by recorder 2 can be browsed, and with this, it is possible to check a situation inside the store in the headquarter.

PC 3 installed in the store is configured as a facility use measuring device which measures the use situation of the store of customers (users), can browse information relating to the use situation of the store generated in PC 3 by PC 3 itself, and furthermore, the information is transmitted to PC 11 installed in the headquarter, can be browsed also in PC 11, and PCs 3 and 11 are configured as browsing devices that browse information relating to the use situation of the store.

Figure 2:
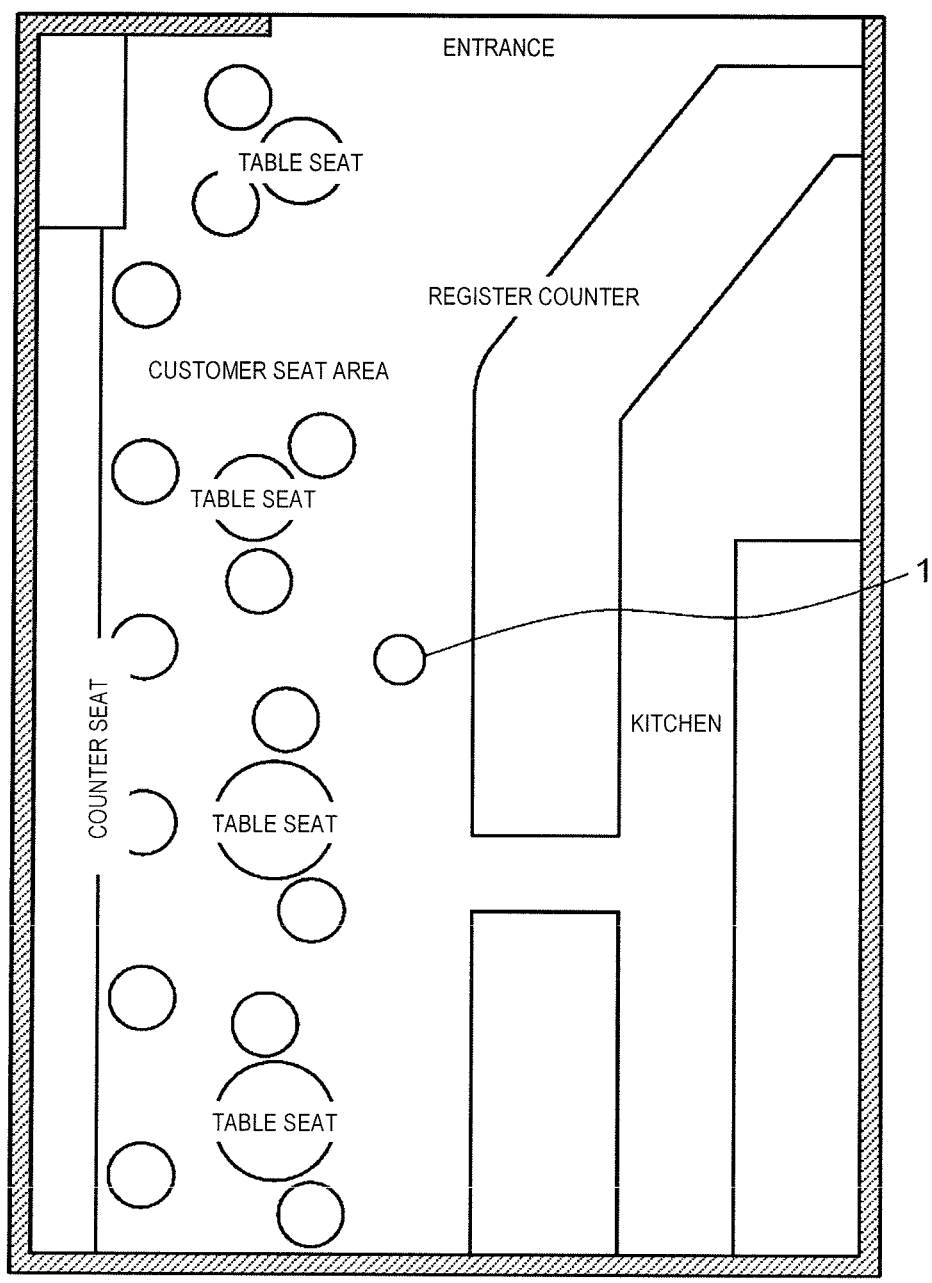
FIG. 2 is a plan view of a store for explaining a layout of the store and an installation situation of camera 1.

Next, description will be made on a layout of a store and an installation situation of camera 1 illustrated in FIG. 1. FIG. 2 is a plan view of a store for explaining a layout of a store and an installation situation of camera 1.

An entrance, a customer seat area, a register counter, a kitchen, and the like are provided in the store. Counter seats and table seats are provided in a customer seat area.

Camera 1 for photographing inside the store is installed in the store. Camera 1 is installed at an appropriate position of the ceiling inside the store. Particularly, in the example illustrated in FIG. 2, an omni-directional camera having a photographing range of 360 degrees by using a fisheye lens is adopted in camera 1 and the customer seat area inside the store can be photographed by camera 1.

Figure 3:
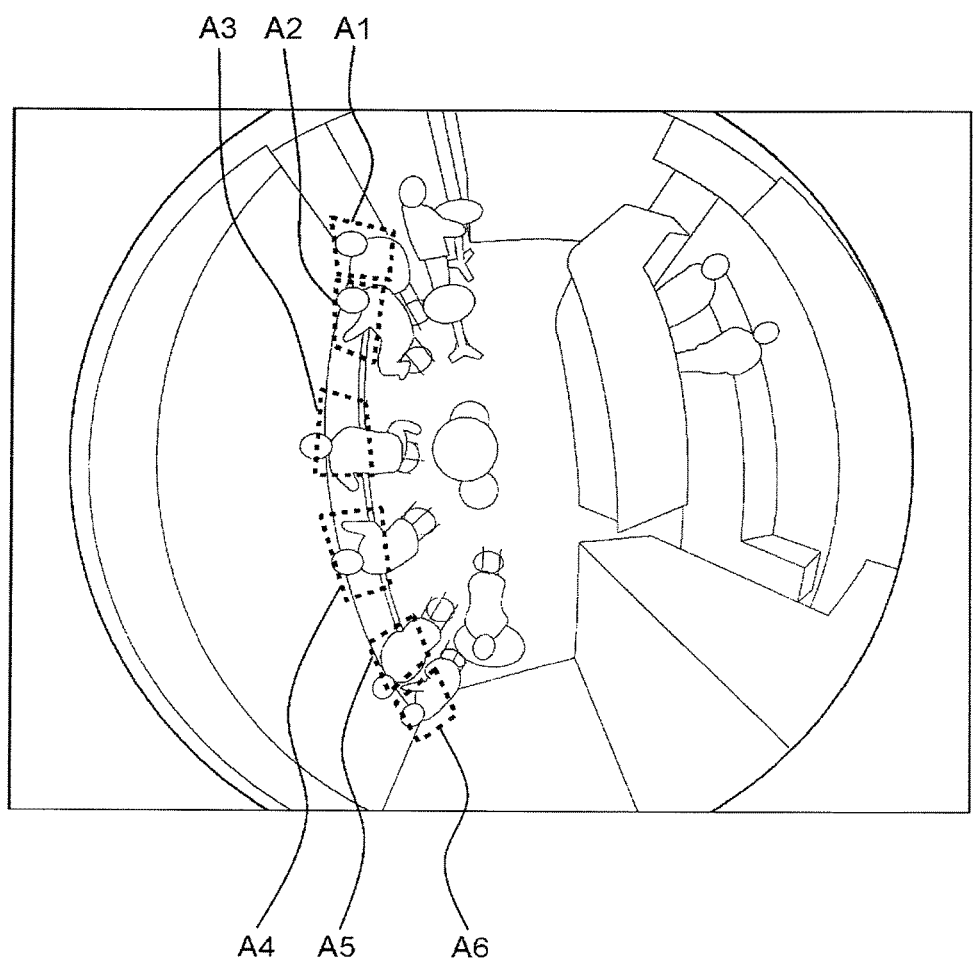
FIG. 3 is an explanatory diagram illustrating an example of staying areas set on an image photographed by camera 1.

Next, description will be made on staying areas set on the image photographed by camera 1 illustrated in FIG. 1. FIG. 3 is an explanatory diagram illustrating an example of staying areas set on an image photographed by camera 1.

In the present embodiment, for the purpose of measuring the use situation of the customer in the store, a plurality of staying areas are set on the image inside the store (monitoring area) photographed by camera 1 in order to determine the presence or absence of stay for customers one by one within the store, specifically, to determine the presence or absence of customers being seated at each seat (chair) in the store. Each of the staying areas is set at a position at which a body of a person seated on the seat is assumed to be present and is set based on the size of the person's body so that a single staying area corresponds to a single person. In the example illustrated in FIG. 3, six staying areas A1 to A6 respectively corresponding to six seats of counter seat 6 are set in order to measure the use situation of the counter seat.

The form of the staying area (position, size, and shape) may be set appropriately by the user, and particularly, when the form of the staying area is adjusted by comparing the measurement result with the actual situation, it is possible to increase measurement accuracy. In the example illustrated in FIG. 3, the staying area is set as a square, but the shape of the staying area may be a polygon, a circular shape, or the like without being limited to the square, and can be further configured in any shape.

Figure 4:
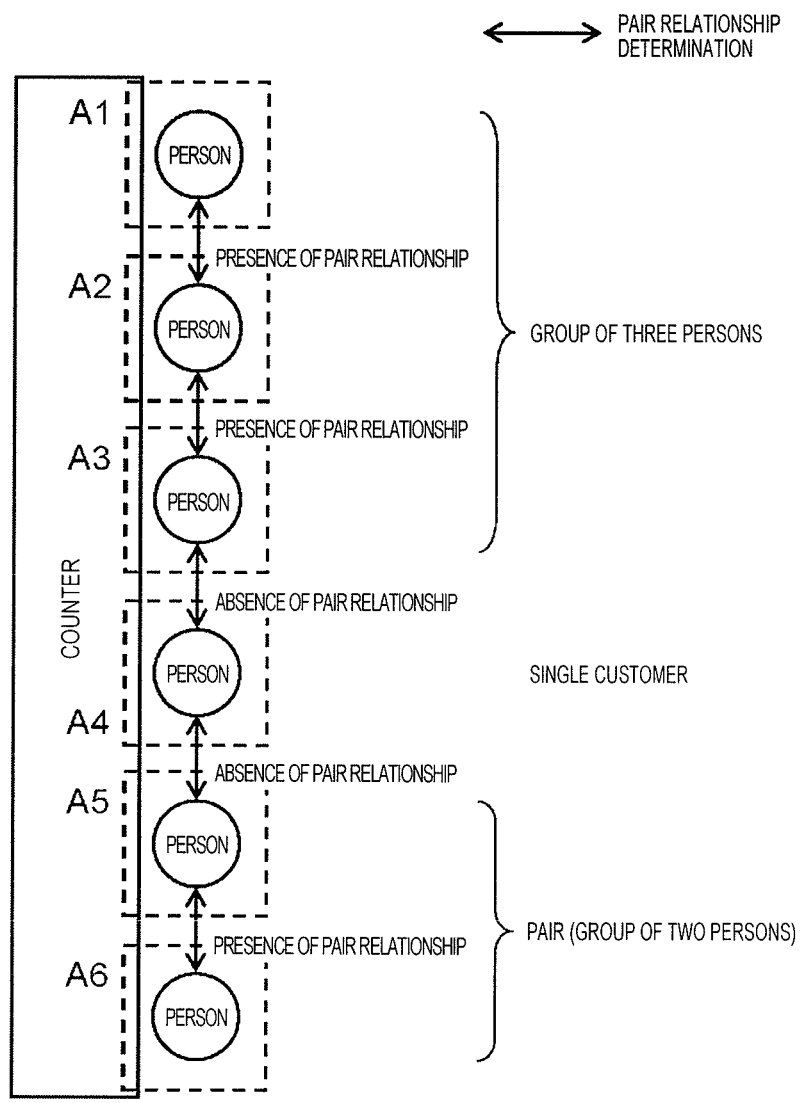
FIG. 4 is an explanatory diagram for explaining guidelines of group configuration determination.

Next, description will be made on an outline of processing performed by PC 3 illustrated in FIG. 1. FIG. 4 is an explanatory diagram for explaining guidelines of group configuration determination.

In the present embodiment, a group configuration of customers who visited the store, that is, whether a single person visited the store, whether persons visited the store in a group, or how many persons in a group visited the store in a case where persons visited the store in a group is determined, and the use situation of the store corresponding to the group configuration is measured.

Here, customers who visit the store in a group are seated at the adjacent seats, and further, situations (stay situations) that respective seats are seated with the customers are similar, that is, the customers are seated at the seats almost at the same time, leave the seats almost at the same time, and the periods during which the customers was seated on the seats are almost the same. For that reason, in a case where the situations that respective seats are seated with the customers are similar between the customers who were seated at the adjacent seats, the customers are very likely to constitute the same group.

Accordingly, in the present embodiment, a combination of two staying areas which are in an adjacency relationship, in which the customers belonging to the same group stay adjacently, is set, stay situations between two staying areas in the adjacency relationship are compared with each other, and pair relationship determination of whether there is a pair relationship (relationship of travelling companion) between the customers who stay in two staying areas or not is performed based on similarity of the stay situations.

The pair relationship determination is sequentially performed for all combinations of the two staying areas which are in the adjacency relationship. In the example illustrated in FIG. 4, the pair relationship determination is performed for all of combinations of a combination of staying areas A1 and A2, a combination of staying areas A2 and A3, a combination of staying areas A3 and A4, a combination of staying areas A4 and A5, and a combination of staying areas A5 and A6. With this, it is possible to acquire the group configuration of all customers who was seated at the seats of the counter seat.

Furthermore, in the present embodiment, a group of three or more persons is determined by focusing on a chain of the pair relationship in which three or more staying areas become a state of being connected in the pair relationship. In the group of three or more persons, the pair relationship is established for all combinations of two customers constituting the group and the chain of the pair relationship occurs. For that reason, in a case where the chain of the pair relationship is present, it is possible to determine that all the customers related to the chain of the pair relationship are the same group and with this, it is possible to determine how many persons in the group visited the store in a case where the customers visited the store in a group.

As such, it is possible to determine the group configuration of customers based on the pair relationship and its chain, specifically, regarding a staying area of interest, it is determined that the group configuration is a single person in a case where the pair relationship between all the staying areas, which are in the adjacency relationship, is not present, it is determined that the group configuration a pair (group of two persons) in a case where the pair relationship is present but the chain of the pair relationships is not present, and it is determined that the group configuration is a group of three persons or more in a case where the chain of the pair relationships is present. Furthermore, it is possible to obtain the number of persons who constitute a group, according to the number of the staying areas related to the chain of the pair relationships.

In the example illustrated in FIG. 4, there is a pair relationship between staying areas A1 and A2, there is a pair relationship between staying areas A2 and A3, and there is the chain of the pair relationships among staying areas A1, A2, and A3, and thus, it is determined that staying areas A1, A2 and A3 are a single group, furthermore, there is no pair relationship between staying area A3 and staying area A4 which is in the adjacency relationship and thus, it is determined that the staying areas are a group of three persons. On the other hand, there is no pair relationship between staying area A3 and staying area A5 which are in the adjacency relationship, it is determined that staying area A4 is a single customer (customer who visited a store by a single person). There is a pair relationship between staying areas A5 and A6 but there is no pair relationship between staying area A5 and staying area A4 which is in the adjacency relationship with staying area A5 and thus, it is determined that the staying areas are a pair (group of two persons).

Figure 6:
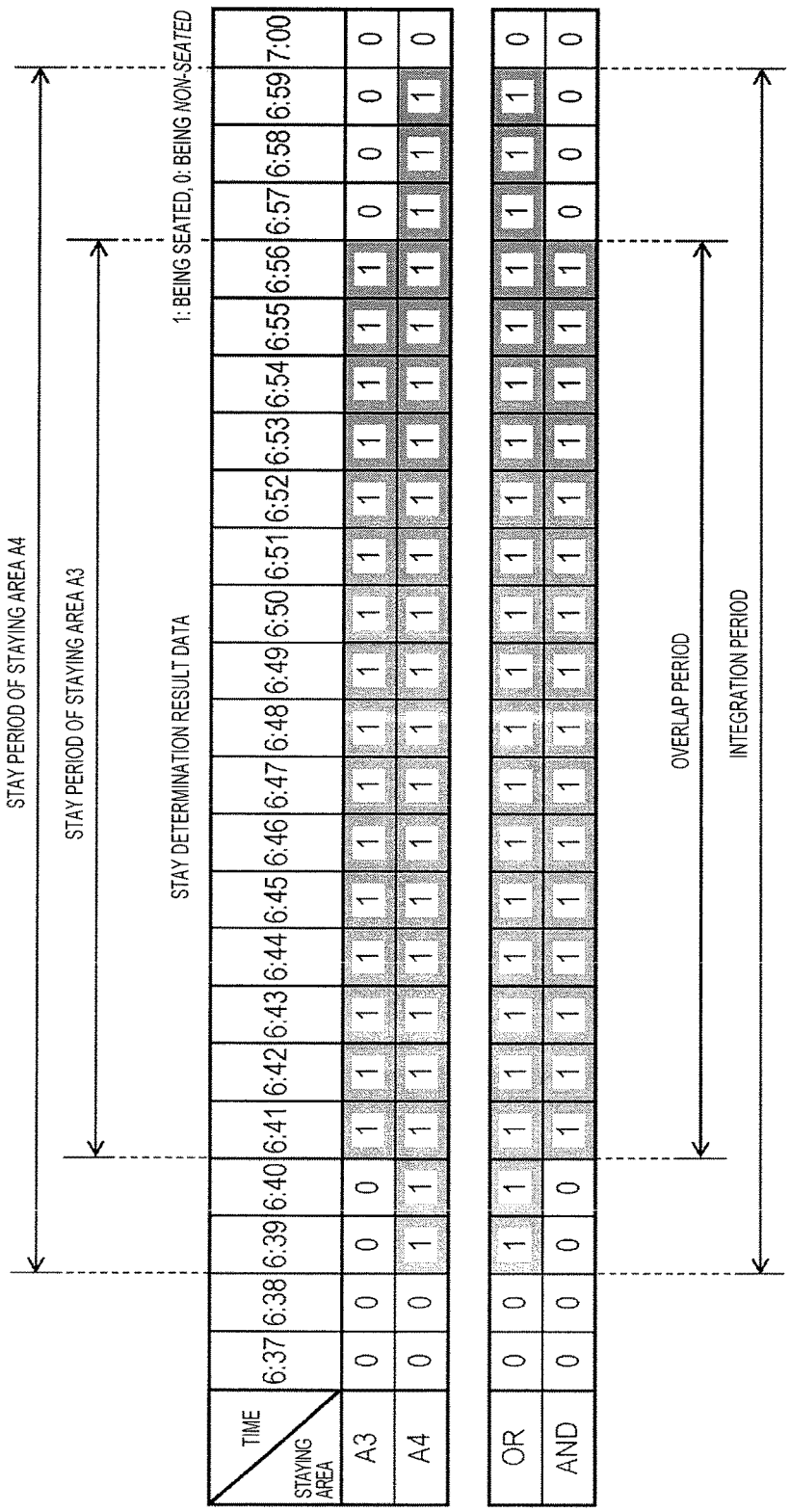
FIG. 6 is an explanatory diagram for explaining guidelines of the pair relationship determination based on stay determination result.

Next, description will be made on guidelines regarding the pair relationship determination in detail. FIG. 5A and FIG. 5B are explanatory diagrams illustrating an example of an image change rate and stay determination result data used for pair relationship determination. FIG. 6 is an explanatory diagram for explaining guidelines of the pair relationship determination based on the stay determination result.

In the present embodiment, the presence or absence of stay (being seated) of the customer is determined for each staying area (seat), a stay period (seated period) of the customer is acquired for each staying area based on the determination result, the stay periods between two staying areas in the adjacency relationship are compared with each other, and the pair relationship determination is performed based on an overlap situation of respective stay periods of two staying areas.

Here, when a person stays in a staying area, change in a range of the staying area on the image of camera 1 appears. That is, the person's body is slightly moved even in a state of being seated at the seat and thus, when the person is present in the staying area, change in the image appears in accordance with the movement of the person's body.

Accordingly, in the present embodiment, an area image obtained by cutting out a range of the staying area from the image of camera 1 is acquired at each time having a predetermined sampling interval, an image change rate, which represents the degree of change of the area image at each time having the predetermined sampling interval with respect to the area image at the immediately preceding time, as illustrated in FIG. 5A, is acquired, and the presence or absence of stay of the customer in the staying area is determined based on the image change rate.

Particularly, in the present embodiment, two area images are compared with each other pixel by pixel and the ratio of the number of pixels on which change appears with respect to the total number of pixels is regarded as the image change rate. Here, a pixel value is influenced by noise and is slightly changed even in a state where a person is not in the staying area. For that reason, a difference (variation) of the pixel values may be calculated, the difference may be compared with a predetermined threshold value, a pixel of which the difference is greater than or equal to the threshold value may be determined as a pixel on which a significant change appears, and the image change rate may be obtained as illustrated in the following equation.

image change rate=number of pixels of which differences are greater than or equal to threshold value/total number of pixels of area image When it is intended to determine the presence or absence of stay of the customer in the staying area, the image change rate may be compared with the predetermined threshold value, and when the image change rate is greater than or equal to the threshold value, it is determined that the customer stays in the staying area, and otherwise, when the image change rate is less than the threshold value, it is determined that the customer does not stayed in the staying area. With this, as illustrated in FIG. 5B, stay determination result data representing a stay determination result at each time in each staying area is obtained.

Furthermore, in the present embodiment, the presence or absence of stay of the customer in the staying area is determined based on continuity of the image change rate at each time. Specifically, when a state where the image change rate becomes greater than or equal to the threshold value is detected consecutively (at least twice), it is determined that the customer stays in the staying area and otherwise, it is determined that the customer does not stayed in the staying area. In a case of a person (clerk or customer) who simply passes through the staying area, a time period during which person stays in the staying area is a short period of time (a few seconds or so), and continuity of the image change rate is taken into account so as to make it possible to avoid erroneous determination due to the person who simply passes through the staying area and increase determination accuracy.

In the present embodiment, as illustrated in FIG. 6, an overlap period in which respective stay periods of two staying areas are overlapped and an integration period including both of respective stay periods of two staying areas are obtained and as a number representing the overlap situations of respective stay periods of two staying areas, an overlap rate, which is a ratio of a length of the overlap period with respect to a length of the integration period, is obtained as illustrated in the following equation.

overlap rate=length of overlap period/length of integration period

Here, the overlap period is a period during which customers are simultaneously staying in both of the two staying areas are staying, integration period, the integration period is a period during which the customers are staying in at least any one of two staying areas, and the overlap rate (simultaneous staying rate) represents how long two customers are simultaneously staying at the same time within a period during which two customers are respectively staying in two staying areas.

As illustrated in FIG. 6, a case (being seated) where the customer is staying in the staying area is represented by "1" and a case (being non-seated) where the customer is not staying in the staying area is represented by "0" in stay determination result data. Then, the overlap period can be determined by performing AND processing (logic operation of logical product (AND)) for stay determination result data of the two staying areas. Further, the integration period can be obtained by performing OR processing (logical operation of logical sum (OR)) for stay determination result data of the two staying areas.

As such, when the integration period and the overlap period of two staying areas are obtained, furthermore, the overlap rate is obtained from the integration period and the overlap period, the pair relationship determination of whether there is a pair relationship between the customers of the two staying areas or not is performed based on the overlap rate. In the pair relationship determination, the overlap rate is compared with a predetermined threshold value (for example, 75%) and when the overlap rate is greater than or equal to the threshold value, it is determined that there is a pair relationship and otherwise, when the overlap rate is less than the threshold value, it is determined that there is no pair relationship.

In FIG. 6, an example when staying areas A3 and A4 are compared is illustrated. In the example illustrated in FIG. 6, the integration period is 21 minutes, the overlap period is 16 minutes, the overlap rate becomes 16/21=0.76 (76%), and the overlap rate is greater than or equal to 75% of the threshold value, and thus, it is determined that there is a pair relationship between staying areas A3 and A4.

Determination is performed for combinations other than the combination of staying areas A3 and A4, that is, the combination of staying areas A1 and A2, the combination of staying areas A2 and A3, the combination of staying areas A4 and A5, and the combination of staying areas A5 and A6. In the example illustrated in FIG. 5A and FIG. 5B, for other combinations, the overlap rate is less than the threshold value in any case and thus, unlike the example illustrated in FIG. 4, it is determined that there is no pair relationship in the combinations other than the combination of staying areas A3 and A4.

Figure 7:
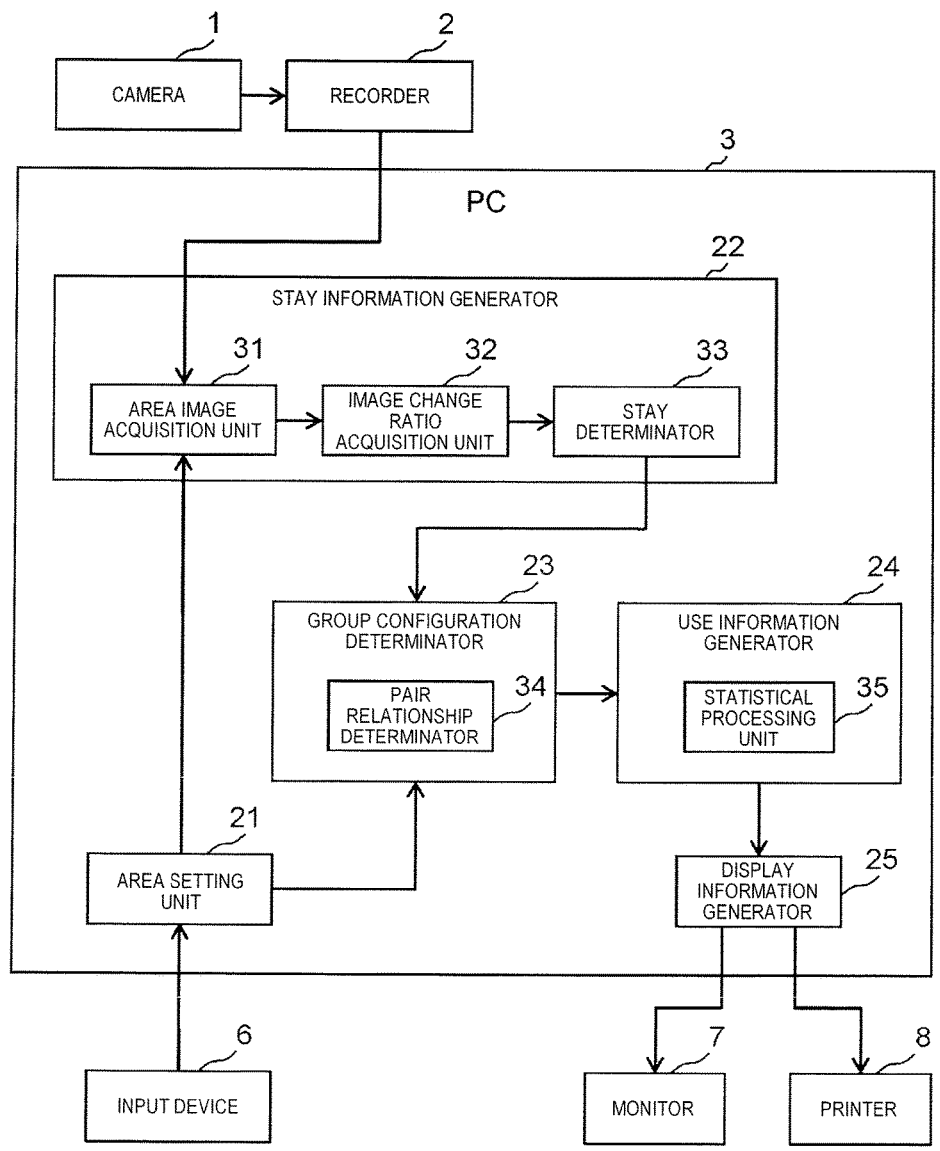
FIG. 7 is a functional block diagram illustrating a schematic configuration of PC 3.

Next, description will be made on a schematic configuration of PC 3 illustrated in FIG. 1. FIG. 7 is a functional block diagram illustrating a schematic configuration of PC 3.

PC 3 includes area setting unit 21, stay information generator 22, group configuration determinator 23, use information generator 24, and display information generator 25.

In area setting unit 21, processing for setting the staying area (see FIG. 3) on the image is performed in order to determine whether respective seats are seated with the customers or not, in response to an input operation of a user. In this processing, an area setting screen, in which the image acquired from camera 1 or recorder 2 is displayed, may be displayed on monitor 7 and the user may be caused to perform an operation of inputting the position of the area on the image using input device 6 such as a mouse, in the area setting screen. In area setting unit 21, processing for setting a combination of two staying areas in the adjacency relationship is performed in response to an input operation by the user.

Stay information generator 22 generates stay information relating to the presence or absence of stay of the customer for each staying area, based on a change situation of the image in the staying area set by area setting unit 21, and includes area image acquisition unit 31, image change rate acquisition unit 32, and stay determinator 33.

In area image acquisition unit 31, processing for acquiring the image inside the store photographed by camera 1 from recorder 2, cutting out the range of the staying area from the image inside the store, and acquiring the area image for each staying area is performed. In the present embodiment, the area image at each time is acquired from the image inside the store at each time having a predetermined sampling interval (for example, one minute).

In image change rate acquisition unit 32, processing for acquiring the image change rate is performed for the area image at each time acquired by area image acquisition unit 31. In the present embodiment, the area image acquired at each time having a sampling interval is compared with the image acquired at the immediately preceding time to thereby acquire the image change rate of the area image with respect to the area image acquired at the immediately preceding time.

In stay determinator 33, processing for determining the presence or absence of stay (seat) of the customer in the staying area (seat) is performed, based on the image change rate acquired at each time in image change rate acquisition unit 32. In stay information generator 22, stay information representing the presence or absence of stay of the customer at each time having a sampling interval is generated based on the determination result of stay determinator 33.

In group configuration determinator 23, processing for comparing pieces of stay information generated for each staying area generated in stay information generator 22 and determining the group configuration of a plurality of customers who are respectively staying at a plurality of staying areas is performed, based on similarity of the pieces of stay information. In the present embodiment, stay periods for every plurality of staying areas are compared and a group configuration of a plurality of customers respectively staying in the plurality of staying areas is determined based on the overlap rate of the stay periods.

Group configuration determinator 23 includes pair relationship determinator 34. In pair relationship determinator 34, the pair relationship determination for comparing pieces of stay information between two staying areas in the adjacency relationship and determining whether there is a pair relationship between the customers who are respectively staying in two staying areas or not, based on similarity of the pieces of stay information is performed. The pair relationship determination is sequentially performed for all combinations of two staying areas in the adjacency relationship.

Furthermore, in group configuration determinator 23, processing for determining a group of three persons or more is performed based on the pair relationship, which becomes a state where three or more staying areas are connected by the pair relationship, based on the determination result of pair relationship determinator 34 and with this, a single person, a pair (group of two persons), and a group of three or more persons are separately determined, as the group configuration.

In use information generator 24, processing for generating use information relating to a use situation of a facility according to the group configuration is performed, based on stay information for each staying area generated in stay information generator 22 and the determination result of the group configuration by group configuration determinator 23.

Use information generator 24 includes statistical processor 35. In statistical processor 35, processing for aggregating stay information for each staying area and the determination result of the group configuration for each per predetermined unit period of time (for example, one day) and generating statistical information relating to the quantity and ratio for each group configuration, as use information, for each unit period of time. In the present embodiment, as statistical information relating to the quantity for each group configuration, the number of customers who visited the store in a single person, the number of sets of pairs, and the number of sets of groups of three persons or more are obtained. In the present embodiment, as statistical information relating to the ratio for each group configuration, a rate of being seated in pair, that is, a ratio of a time period during which the customers of which the group configuration is determined as a pair, among the time period during which the customers were seated, in all targeted seats inside the store, is obtained.

In display information generator 25, processing for generating display information, which displays statistical information for each unit period of time relating to the quantity and the ratio for each group configuration, which is use information generated in use information generator 24, by a table and a graph and outputting display information is performed. In the present embodiment, display information relating to a measurement result report (see FIG. 11A, FIG. 12 and FIG. 13) which displays statistical information relating to the quantity for each group configuration, that is, the number of customers who visited the store in a single person, the number of sets of pairs, and the number of sets of groups of three persons or more or a measurement result report (see FIG. 11B and FIG. 12) which displays statistical information relating to the ratio for each group configuration is generated, the measurement result report is output to monitor 7 to be displayed, and is output to be printed by printer 8.

Respective components of PC 3 illustrated in FIG. 7 can be realized by causing the CPU of PC 3 to execute a program (instructions) for facility use situation measurement. The program may be provided to the user through a network by being recorded into a suitable program recording medium as an application program that runs on a general OS, in addition to configuring the programs as a dedicated device by being introduced into a storage device (HDD or the like) of PC 3 as the information processing device.

Figure 8:
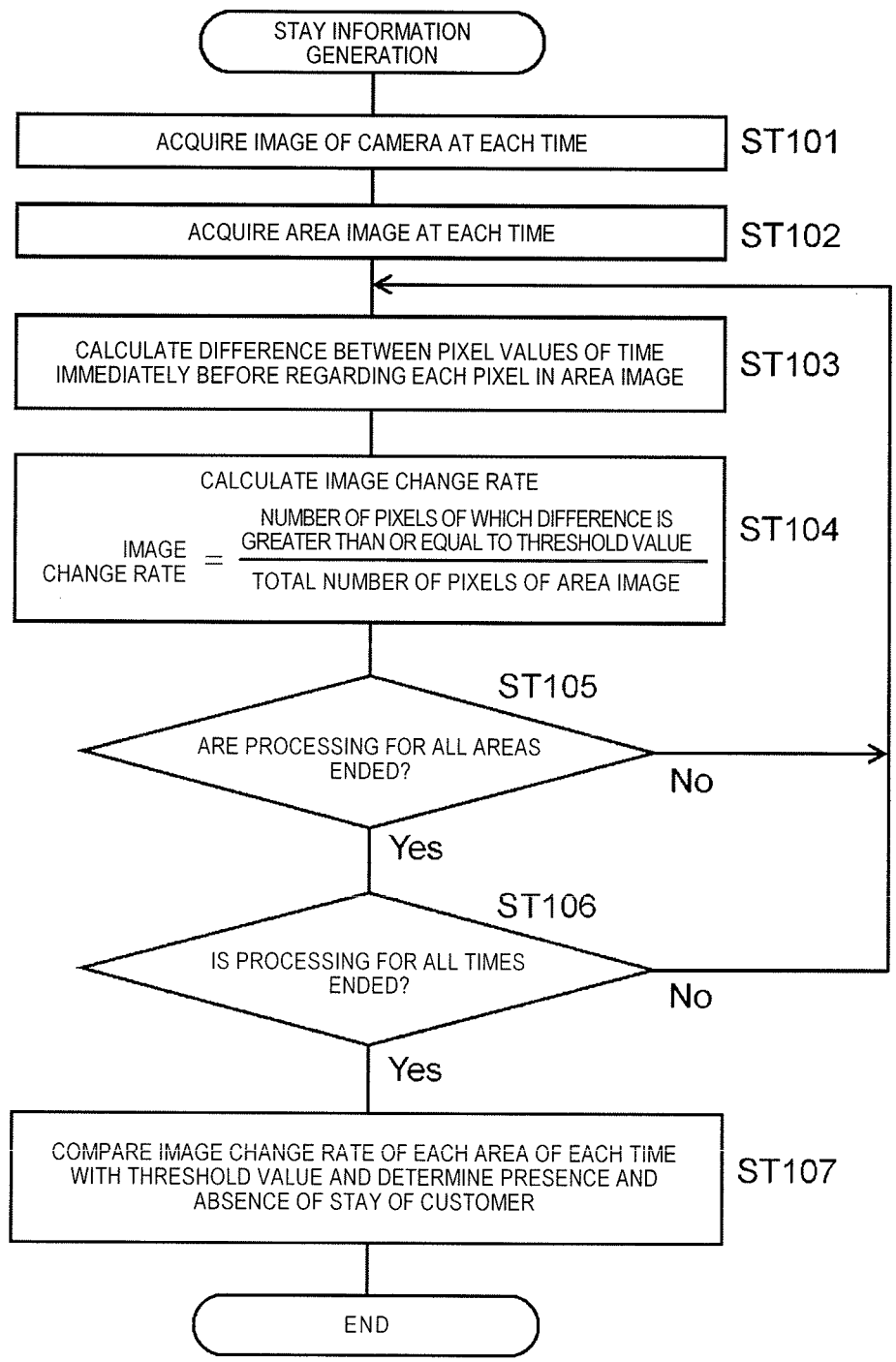
FIG. 8 is a flowchart illustrating a procedure of a process performed by stay information generator 22.

Next, description will be made on a process performed by stay information generator 22 illustrated in FIG. 7. FIG. 8 is a flowchart illustrating a procedure of a process performed by stay information generator 22.

In the present embodiment, the area image at each time is acquired for each staying area in area image acquisition unit 31 of stay information generator 22, the image change rate at each time is acquired from the area image at each time in image change rate acquisition unit 32, and the presence or absence of stay of the customer in each staying area at each time is determined in stay determinator 33.

Specifically, first, an image (frame) inside the store at each time having a predetermined sampling interval (for example, one minute) is acquired (ST101). An area image for each staying area at each time is acquired by cutting out the range of the staying area from the image inside the store at each time (ST102).

Next, as represented by the following equation, RGB color values (R, G, B) of each pixel are acquired for all pixels of each frame within the area image. Then, a difference (difference between frames Dn) between pixel values (Rn, Gn, Bn) of the area image at the time of interest (n) and pixel values (Rn−1, Gn−1, Bn−1) of the area image of the immediately preceding time (n−1) is calculated for each pixel (ST103).

$$\text{difference } Dn=(Rn,Gn,Bn)-(Rn-1,Gn-1,Bn-1)$$

The difference may be set as a total value of respective differences between R values, G values, and B values. It is also possible to calculate the difference by converting the values to luminance.

Next, the difference of each pixel is compared with a predetermined threshold value and as represented by the following equation, the image change rate, that is, a ratio of the number of pixels of which the difference is greater than or equal to the threshold value with respect to the total number of pixels of the area image is calculated (ST104).

image change rate=number of pixels of which difference is greater than or equal to threshold value/ total number of pixels of area image Next, determination of whether processing for all staying areas is ended or not is performed (ST105), and when processing for all staying areas is not ended (No in ST105), the process proceeds to processing of next staying area and this is repeated until processing for all staying areas in ended. With this, the image change rate for all staying areas at a certain time may be obtained. Next, determination of whether processing at all times within a target period is ended or not is performed (ST106), and when processing at all times within the target period is not ended (No in ST106), the process proceeds to processing of next time and this is repeated until processing at all times in ended. With this, the image change rate for all staying areas of the all times may be obtained.

Next, the image change rate for each staying area at each time is compared with a predetermined threshold value and the presence or absence of stay of the customer for each staying area concerning each time is determined (ST107). Here, when the image variation rate is greater than or equal to the threshold value, it is determined that the customer is staying in the staying area at the time.

With this, a stay determination result indicating the presence or absence of stay of the customer for each staying area at each time (see FIG. 5B) is obtained.

Next, description will be made on a process performed by group configuration determinator 23 illustrated in FIG. 7. FIG. 9 is a flowchart illustrating a procedure of a process performed by group configuration determinator 23.

In the present embodiment, in group configuration determinator 23, the stay periods between two staying areas in the adjacency relationship are compared with each other and the pair relationship determination of whether there is a pair relationship between the customers who are respectively staying in two staying areas or not is performed, based on the overlap rate of respective stay periods of the two staying areas.

Specifically, first, pieces of stay determination result data of one day relating to two staying area in the adjacency relationship are compared with each other and pieces of stay determination result data of a required range including the time, at which it is determined that the customers are simultaneously staying at the same time, are extracted (ST201).

Next, OR processing is performed for the pieces of stay determination result data of two staying areas so as to acquire an integration period including both of respective stay periods of two staying areas, that is, a period during which the customers are staying in at least any one of two staying areas (ST202).

AND processing is performed for the pieces of stay determination result data of two staying areas so as to acquire an overlap period during which respective stay periods of two staying areas are overlapped, that is, a period during which the customers are simultaneously staying in both of two staying areas (ST203).

The overlap rate (simultaneous staying rate) is obtained from the integration period and the overlap period relating to two staying areas, as represented by the following equation (ST204).

overlap rate=length of overlap period/length of integration period

Next, the overlap rate is compared with the threshold value (for example, 75%) to determine whether the overlap rate exceeds the threshold value or not (ST205), and in a case where the overlap rate exceeds the threshold value (Yes in ST205), it is determined that there is a pair relationship between the customers of two staying areas (ST206). On the other hand, in a case where the overlap rate does not exceed the threshold value (No in ST205), the process proceeds to processing of the next combination of the staying areas.

Then, determination of whether processing for all combinations of the staying areas is ended or not (ST207) and when processing for all combinations of the staying areas is not ended (No in ST207), the process proceeds to processing of the next combination of staying areas and this is repeated until processing for all combinations of the staying areas is ended. With this, the pair determination results relating to all combinations of the staying areas are obtained.

Figure 10A:
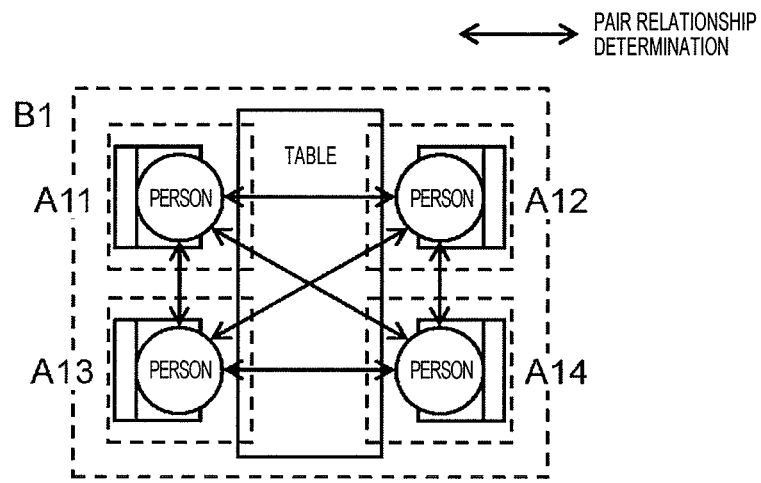
FIG. 10A is an explanatory diagram for explaining guidelines of group configuration determination in a case of a table seat.
Figure 10B:
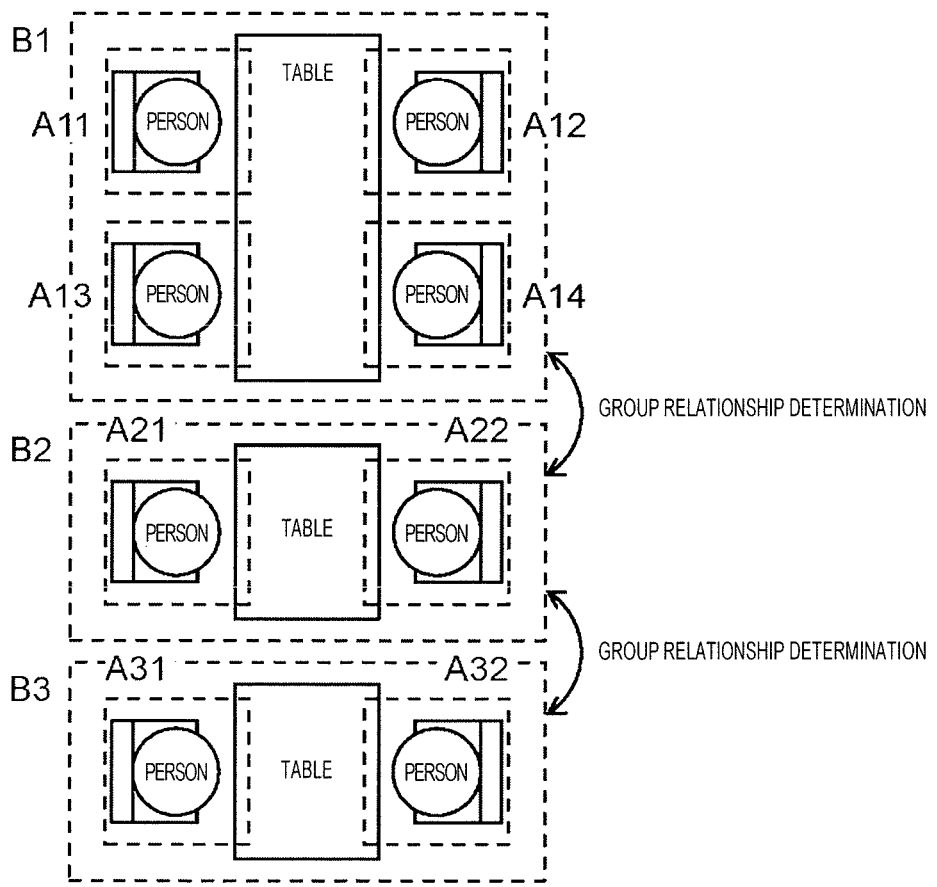
FIG. 10B is another explanatory diagram for explaining guidelines of group configuration determination in the case of the table seat.

As described above, although description was made on an example of determining the group configuration of the customers in the counter seat, description will be made on the group configuration determination in a case of a table seat. FIG. 10A and FIG. 10B are explanatory diagrams for explaining guidelines of group configuration determination in a case of the table seat.

In FIG. 4, although an example of the group configuration determination in the case of the counter seat is illustrated, in the case of the table seat, the group configuration is determined in a procedure different from that of the case of the counter seat, as illustrated in FIG. 10A and FIG. 10B. That is, although the customers who visit the store in a group are seated on adjacent seats in the counter seat, there are a variety of cases, such as a case where the customers are seated to face each other across the table, a case where the customers are seated side by side on one side of the table, a case where the customers are seated to face each other obliquely across the table, in the table seat.

Accordingly, in the present embodiment, as illustrated in FIG. 10A, plurality of staying areas A11 to A14 corresponding to respective seats of one table seat are set, one staying area group B1 obtained by integrating plurality of staying areas A11 to A14 is set, and the pair relationship is determined for all combinations of staying area A11 to A14 by targeting plurality of staying areas A11 to A14 where the customers are staying in one staying area group B1. With this, it is possible to determine the group configuration of the customer who is seated at one table. Normally, the possibility that unknown customers are seated at the same table is low and thus, determination may also be performed in anticipation of the group relationship of the customer to be seated at the same table. That is, the threshold value for comparing the overlap rate is set to be smaller than the threshold value used in the counter seat in determination of the pair relationship at the table seat to thereby make it possible to perform determination in anticipation of the group relationship.

Next, description will be made on processing for determining the group relationship between a plurality of table seats. In a case where there is no table seat where all customers within a group can be seated, the customers who visited the store in the group may be seated by being divided into adjacent table seats. In this case, when it is possible to grasp the group relationship about whether the customers who are seated at adjacent seats constitute the same group or not, it is possible to more accurately acquire the group configuration of the customers.

Accordingly, in the present embodiment, the group relationship between the adjacent table seats is determined, as illustrated in FIG. 10B. In the determination of the group relationship, staying area groups B1, B2, and B3 obtained by integrating staying areas A11 to A14, A21, A22, A31, and A32 of respective table seats for each table seat are set and the group relationship between two adjacent staying area groups B1, B2, and B3 is determined. In this case, similar to the determination of the pair relationship described above, the overlap period and the integration period between two adjacent staying area groups may be obtained, the overlap rate may be obtained from the overlap period and the integration period, and the group relationship may be determined based on the overlap rate. With this, it is possible to determine the group configuration of the customers who are seated at a plurality of table seats.

As such, in a case of the table seat, it is possible to determine the group configuration of the customers who are seated at a single table seat, and for example, by a table for four persons, it is possible to determine whether the group is a pair (group of two persons), a group of three persons, or a group of four persons. Furthermore, it is possible to determine the group configuration of the customers who are seated at the plurality of table seats, and for example, in a case where the table for two persons and the table for four persons are arranged side by side, it is possible to determine a group of four persons or more.

Next, description will be made on a process performed in use information generator 24 and display information generator 25 illustrated in FIG. 7. FIG. 11A to FIG. 13 are explanatory diagrams illustrating measurement result reports output from monitor 7 or printer 8.

In the present embodiment, processing for aggregating stay information for each staying area and the determination result of the group configuration for each predetermined unit period and generating statistical information relating to the quantity and the ratio for each group configuration for each unit period is performed in statistical processor 35 of use information generator 24, and processing for generating display information displaying statistical information by a table and a graph and outputting the displayed information is performed in display information generator 25. With this, the measurement result reports illustrated in FIG. 11A to FIG. 13 are output to monitor 7 and printer 8.

The numbers of pairs of respective days in one month are described by a table in the measurement result report illustrated in FIG. 11A. Furthermore, the average values of the pair group numbers for each day of the week are described in the measurement result report. In the present embodiment, it is possible to understand what pairs are seated at the targeted seat inside the store at one day based on stay information for each staying area and determination result of the group configuration to thereby make it possible to grasp the number of sets of pairs of each day.

The rate of being seated in pairs of respective days in one month are described by a table in the measurement result report illustrated in FIG. 11B. The rate of being seated in pair is a ratio of a time period during which the customers, of which the group configuration is determined as a pair, among the time period during which the customers were seated, in all targeted seats inside the store in one day and is obtained by the following equation.

rate of being seated in pair=total value of time
period of being seated of customers determined
as pair/total value of time period of being
seated of each seat In the present embodiment, it is also possible to understand time period of being seated of respective customers determined as the pair and time period of being seated of respective seats based on the stay information for each staying area and the determination result of the group configuration to thereby make it possible to obtain the rate of being seated in pair of each day.

In the measurement result report illustrated in FIG. 11C, the ratios of time period of being seated (time occupancy rates) of respective days in one month are described by a table. The ratio of time period of being seated is a ratio of the time period during which the customers were seated in all targeted seats when a state where all targeted seats inside the store are filled in opening time, in one day, is set as 100%, and is obtained by the following equation.

ratio of time period of being seated=total value of
time period of being seated of respective seats/
(number of seats×opening time)

In the present embodiment, it is possible to understand the time period of being seated of each seat, based on stay information for each staying area, to thereby make it possible to obtain the ratio of time period of being seated of each day.

Figure 12:
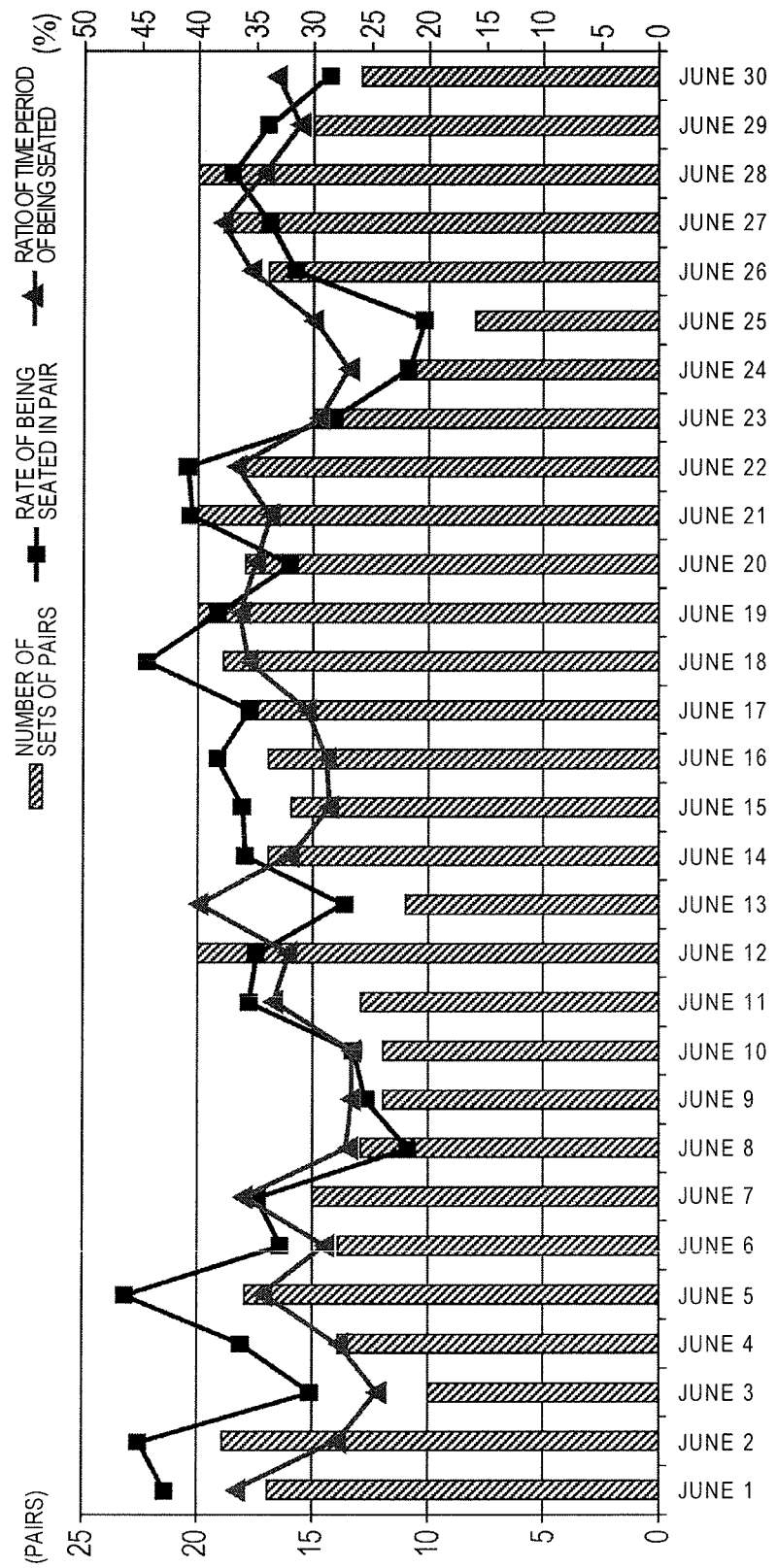
FIG. 12 is an explanatory diagram illustrating the measurement result report output from monitor 7 or printer 8.

In the measurement result report illustrated in FIG. 12, the number of sets of pairs, rate of being seated in pair, and ratio of time period of being seated in respective days of one month described in the tables in the measurement result report illustrated in FIG. 11A, FIG. 11B, and FIG. 11C are described by a graph.

Figure 13:
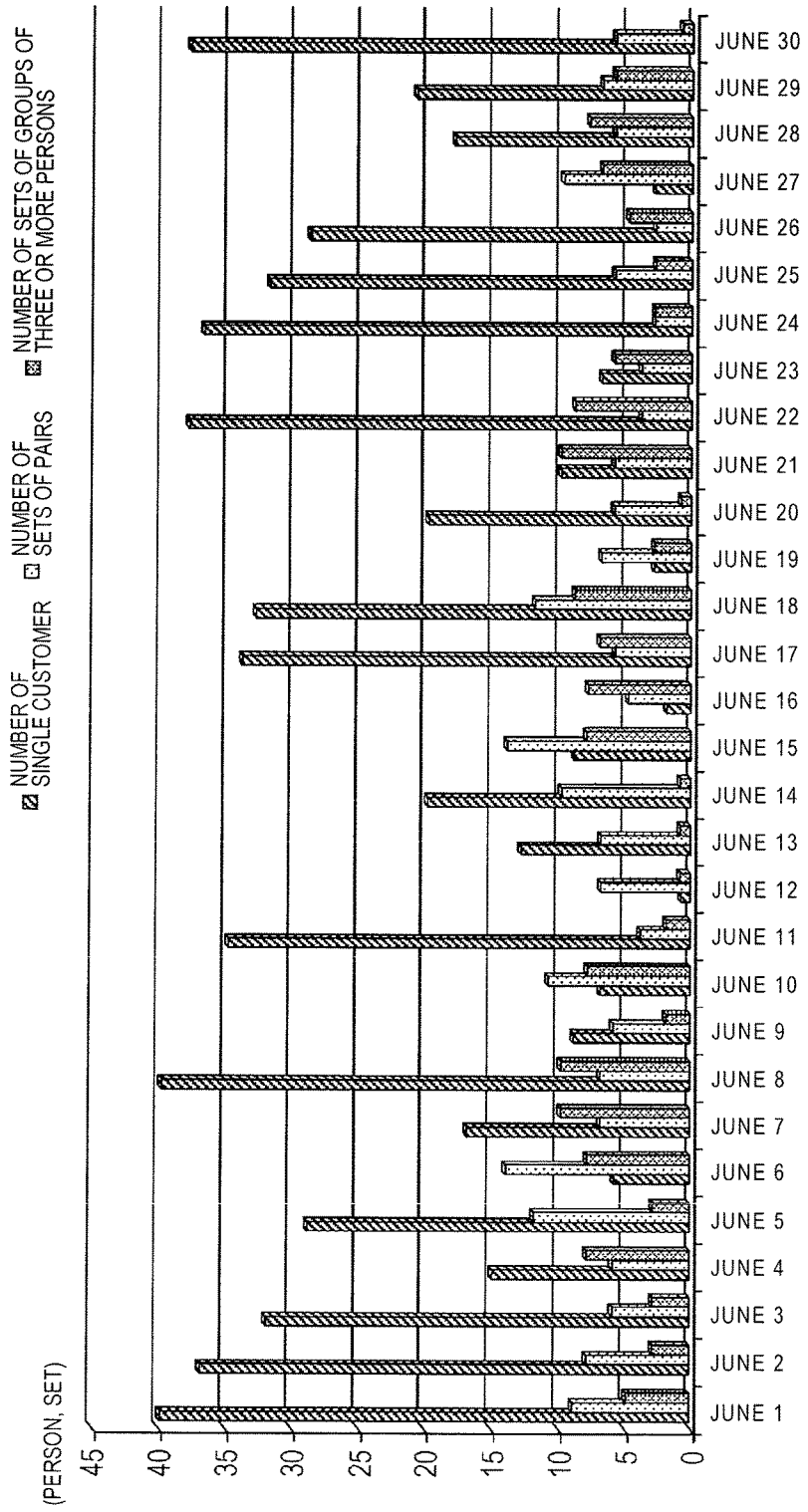
FIG. 13 is an explanatory diagram illustrating another measurement result report output from monitor 7 or printer 8.

In the measurement result report illustrated in FIG. 13, the quantities for respective group configurations, that is, the numbers of customers in a single person (customer who visited a store by a single person), the numbers of sets of pairs, and the numbers of sets of groups of three persons or more, in respective days of one month are described by a graph. In the present embodiment, it is possible to understand how many times respective seats inside the store were seated with what kind of a group configuration of customers, based on the stay information for each staying area and the determination result of the group configuration, to thereby make it possible to obtain the number of a single person, the number of sets of pairs, and the number of sets of groups of three persons or more of each day.

As such, in the present embodiment, the number of customers who visited the store in a single person, the number of sets of pairs, and the number of sets of groups of three persons or more are acquired as statistical information relating to the quantity for each group configuration and statistical information relating to the quantity for each group configuration is represented by a table or a graph in the measurement result report. In the present embodiment, the rate of being seated in pair is acquired as statistical information relating to the ratio of each group configuration and statistical information relating to the ratio of each group configuration is represented by a table or a graph in the measurement result report.

The user browses the measurement result report and conducts change of tables or seats inside the store so as to make it possible to realize an appropriate layout in response to the group configuration of the customers. For example, in a case where the number of customers who visited the store in a single person is large, a table seat or counter seat for a single person may be increased, in a case where the number of sets of pairs is large, a table seat for two-person may be increased, and in a case where the number of sets of groups of three persons or more is large, a table seat for four-person may be increased.

In the present embodiment, statistical information per each day relating to the quantity and the ratio for each group configuration may be generated by aggregation processing in which the unit period of time is set as one day and statistical information are output in statistical processor 35. However, the group configuration of the customer may be significantly different in time zones. In this case, statistical information for each time zone may be generated and output by aggregation processing in which the unit period of time is set as a time zone. As such, the user who browsed statistical information for each time zone changes the layout inside the store according to the time zone so as to make it possible to realize a more appropriate layout in response to the group configuration of the customers.

In the present embodiment, as illustrated in FIG. 11B, the rate of being seated in pair is obtained as statistical information relating to the ratio for each group configuration and the measurement result report thereof is output. However, statistical information relating to the ratio for each group configuration is not limited thereto. It is possible to obtain statistical information relating to various ratios such as the seated ratio of the customer who visited the store in a single person, that is, a ratio of a time period during which the customer whose the group configuration is determined as a single person was seated among the time period during which the customers were seated (entire time period of being seated) at all targeted seats inside the store, the seated ratio of the group of three persons or more, that is, a ratio of a time period during which the customers whose the group configuration is determined as three persons or more were seated among the entire time period of being seated, and the like.

In the present embodiment, as illustrated in FIG. 13, although groups of which the number of persons who constitute a group is three or more are collected to be classified as a single group configuration and the number of sets of groups is obtained, the group configurations may be finely classified according to the number of persons who constitute a group, for example, the groups may be classified into a group of three persons and a group of four persons or more.

As described above, in the present embodiment, in area setting unit 21, the plurality of staying areas are set on the image inside the store (monitoring area) in order to determine the presence or absence of stay of the customers. In stay information generator 22, stay information relating to the presence or absence of stay of the customer for each staying area is generated based on the change situation of the image in the staying area. In group configuration determinator 23, pieces of stay information for every at least two staying areas are compared and the group configuration for the customers who are respectively staying at the staying areas are determined based on similarity of the pieces of stay information. In use information generator 24, use information relating to the use situation of the store according to the group configuration is generated based on stay information for each staying area and the determination result of the group configuration. Furthermore, in display information generator 25, display information displaying use information is generated and output. With this, the group configuration of the customers is determined based on similarity of stay information for each staying area and thus, it is possible to accurately determine the group configuration of the customers.

In the present embodiment, in group configuration determinator 23, groups of a single person, a pair, and three persons or more are separately determined as the group configuration and in use information generator 24, information relating to the quantity for each group configuration is generated, as use information.

With this, the user can grasp the quantity for each group configuration, that is, the number of customers who visited the store in a single person, the number of sets of pairs, and the number of sets of groups of three persons or more. The improvement measures are conducted, for example, change in the layout of the table or the seat is conducted to correspond to the group configuration of the customer, based on the quantity for each group configuration, so as to make it possible to realize efficient management of the store, for example, improvements in a seat operation ratio.

In the present embodiment, stay information generator 22 acquires the stay period of the customers for each staying area. On the other hand, group configuration determinator 23 compares the stay periods for each staying area and determines the group configuration of the customers based on the overlap rate of the stay periods. When the overlap rate is high, similarity of stay information for each staying area is high, and it can be determined that the customers who are respectively staying in the staying areas constitute the same group and thus, it is possible to accurately determine the group configuration.

In the present embodiment, stay information generator 22 acquires the image change rate of the image at each time having a predetermined sampling interval with respect to the image at the immediately preceding time of the sampling interval. Stay information generator 22 determines the presence or absence of stay of the customer for each staying area based on continuity of the image change rate at each time and acquires the stay period for each staying area. The image change rate reflects a motion of the human body of the customer who is present in the staying area and thus, the presence or absence of stay of the customer in the staying area can be accurately determined by the image change rate. Accordingly, erroneous determination due to the person who simply passes through the staying area can be avoided by focusing on continuity of the image change rate and thus, it is possible to increase determination accuracy.

In the present embodiment, area setting unit 21 sets a combination of the two staying areas in the adjacency relationship, in which the customers belonging to the same group stay adjacently. Group configuration determinator 23 compares stay information between two staying areas in the adjacency relationship and performs the pair relationship determination of whether there is a pair relationship between the customers who stay in two staying areas or not. The pair relationship determination is sequentially conducted for all combinations of two staying areas in the adjacency relationship. With this, the pair relationship determination between two staying areas may be repeated and thus, the group configuration determination for the customers can be easily performed.

In the present embodiment, in group configuration determinator 23, in a case where there is a chain of the pair relationships which become a state where three or more staying areas are connected in the pair relationship, the group configuration can be assumed to be determined as a group of three or more persons and the group of three or more persons can be determined by focusing on the chain of the pair relationships.

In the present embodiment, in statistical processor 35 of use information generator 24, statistical information relating to the quantity and the ratio for each group configuration for each unit period is generated as use information by aggregating the determination result of stay information for each staying area and the group configuration for each predetermined unit period, and in display information generator 25, display information displaying statistical information for each unit period by a table and a graph is generated and output. With this, a table or a graph of statistical information for each unit period relating to the quantity and the ratio for each group configuration is presented to the user and thus, the user can grasp how the use situation of the store according to the group configuration is being changed.

Thus, although the present invention is described based on specific embodiments, these embodiments are merely illustrative and the present invention is not limited to these embodiments. Furthermore, all of respective constituents of the facility use measuring device, the facility use measuring system, and facility use measuring method according to the present invention indicated in the embodiments described above are not necessarily essential and at least, it is possible to appropriately choose the constituents without departing from the scope of the present invention.

For example, in the above-described example, although description is made on an eating and drinking place such as a coffee shop or a restaurant, it is not limited to such eating and drinking place, a facility other than a store may also be available, seats for the user are provided in, for example, a public facility or an event venue, and it is beneficial to grasp the use situation according to the group configuration of the user in such facility. In addition to the seat, the user may also stay in an area in which various equipment and goods are arranged in the facility, and even in such a case, it is possible to determine the use situation of the facility using the stay situation of the user in a predetermined area.

In the above-described example, as illustrated in FIG. 2, although an omni-directional camera having a photographing range of 360 degrees using a fisheye lens is adopted as camera 1, a camera having a predetermined field angle so-called box camera may also be available.

In the above-described example, in image change rate acquisition unit 32, although the image change rate may be acquired by comparing with the image at the time of the previous sampling interval, the image change rate may be obtained by comparing with an image which becomes a predetermined reference, for example, an image obtained by photographing in a state where a person is not present or an image having only a background obtained by excluding an area for a person based on a plurality of images.

In the above-described example, although the pair relationship of the customers who are respectively staying (being seated) in two staying areas (seats) is determined and the group of three or more customers is also determined based on the chain of the pair relationships, the group relationships of three or more customers who are respectively staying in three or more staying areas may be collectively determined.

In this case, AND processing and OR processing may be performed by targeting for all pieces of stay determination result data of three or more staying areas so as to obtain the overlap period and the integration period, and furthermore, the overlap rate may be obtained from the overlap period and the integration period and the group relationship determination may be performed based on the overlap rate. In this case, when the staying area in which the customer is not present is included in the targets, appropriate AND processing cannot be performed and thus, the staying area in which the customer is not present may be excluded from the targets. The method in which the group relationships of three or more staying areas are collectively determined is suitable for the table seat but may also be applied to the counter seat.

In the above-described example, although the overlap rate which is a percentage of two time periods (integration period and the overlap period) relating to two staying areas which are in the adjacency relationship are obtained and the overlap rate is compared with the threshold value so as to determine the pair relationship, a group configuration determination is not limited thereto.

For example, in a case where the stay period is short, it is considered that deviation of the stay period for every two staying areas is relatively large and thus, erroneous determination by which the pair relationship is overlooked is likely to occur. Accordingly, when an integration period is obtained from the stay period for each staying area and the stay situations for every two staying areas are coincident with each other, that is, it becomes a state where the customers are staying in two staying areas in the same manner, in a period obtained by cutting out a predetermined time width from a start point and an end time point of the integration period, it is determined that there is a pair relationship. The difference between the integration period and the overlap period is obtained and the difference is compared with the threshold value to determine the pair relationship. In this way, it is possible to avoid a drawback that influence by the deviation of the stay period becomes large in a case where the stay period is short.

In the above-described example, although processing required for measuring facility use situation is performed by PC 3 provided in the store, required processing may be performed by PC 11 provided in the headquarter or cloud computer 12 constituting a cloud computing system, as illustrated in FIG. 1. Required processing may be shared among a plurality of information processing devices and information may be transferred between the plurality of information processing devices through a communication medium such as an IP (internet protocol) network or a LAN (local area network). In this case, the facility use measuring system is constituted with the plurality of information processing devices among which required processing is shared.

Particularly, in a system configuration including cloud computer 12, necessary information may be allowed to be displayed in a portable terminal such as smartphone 13 or tablet terminal 14 connected to cloud computer 12 through a network, in addition to PCs 3 and 11 provided in the store and the headquarter and with this, it is possible to check necessary information at an arbitrary place such as a visiting place, in addition to the store or the headquarter.

In the above-described example, although recorder 2 which accumulates the images of camera 1 is installed in the store, in a case where processing required for measuring facility use situation is performed by PC 11 installed in the headquarter or cloud computer 12, the images of camera 1 may be transmitted to a management facility such as the headquarter or the cloud computing system and the images of camera 1 may be accumulated in a device installed in the management facility.

In the above-described example, although processing required for measuring facility use situation is performed by PC 3 installed in the store, a required screen is displayed on monitor 7 of PC 3, and necessary inputting and outputting is performed by PC 3, necessary inputting and outputting may be performed by an information processing device, which is different from the information processing device performing processing necessary for measuring facility use situation, for example, PC 11 installed in the headquarter or a portable terminal such as tablet terminal 14.

As described above, the facility use measuring device by the present embodiment determines the group configuration of the users based on the image obtained by photographing inside the facility and measures the use situation of the facility according to the group configuration. The facility use measuring device includes a processor and a memory storing instructions. The processor executes the following matters as the instructions stored in the memory. First, the processor is configured to set a plurality of staying areas on the image in order to determine the presence or absence of stay of the user. Next, the processor is configured to generate stay information relating to the presence or absence of stay of the user for each staying area based on the change situation of the image in the staying area. Then, the processor is configured to compare pieces of stay information for every at least two staying areas based on similarity of the pieces of stay information and determine the group configuration regarding the users who are respectively staying in the staying areas. The processor is configured to generate use information relating to the use situation of the facility according to the group configuration based on stay information for each staying area and the determination result of the group configuration. Furthermore, the processor is configured to generate display information displaying the use information and output display information.

According to this, the group configuration of the users is determined based on similarity of pieces of stay information for each staying area and thus, it is possible to accurately determine the group configuration of the users in the facility in which positions where the users stay are determined in advance.

The processor is configured to separately determine groups of a single person, a pair, or three persons or more as the group configuration and generate information relating to the quantity for each group configuration, as use information.

According to this, the user can grasp the quantity for each group configuration, that is, the number of users who visited the store in a single person, the number of sets of pairs, and the number of sets of groups of three persons or more. It is possible to examine the improvement measures based on the quantity for each group configuration so as to realize efficient management of the facility. For example, in the store, change in the layout of the table or the seat is conducted to correspond to the group configuration of the customer so as to make it possible to realize efficient management of the store, for example, improvements in a seat operation ratio.

The processor is configured to acquire the stay period of the user for each staying area, compare the stay period for each staying area, and determine the group configuration of the user based on the overlap rate of the stay period.

According to this, when the overlap rate is high, similarity of stay information for each staying area is high, and it can be determined that the customers who are staying in respective staying areas constitute the same group and thus, it is possible to accurately determine the group configuration.

The processor is configured to acquire the image change rate of the image at each time having a predetermined sampling interval with respect to the immediately preceding time of the sampling interval and determine the presence or absence of stay of the user for each staying area based on continuity of the image change rate. As such, the processor may acquire the stay period for each staying area.

According to this, the image change rate acquired by comparing with the immediately preceding image of a predetermined sampling interval reflects a motion of the human body of the customer who is present in the staying area. For that reason, it is possible to accurately determine the presence or absence of stay of the user in the staying area by the image change rate. Accordingly, erroneous determination due to the person who simply passes through the staying area may be avoided by focusing on continuity of the image change rate into and thus, it is possible to increase determination accuracy.

The processor is configured to set a combination of the two staying areas in the adjacency relationship, in which the users belonging to the same group stay adjacently. The processor is configured to compare stay information between two staying areas in the adjacency relationship. Furthermore, the processor performs the pair relationship determination of whether there is a pair relationship between the users who stay in two staying areas or not. As such, the processor is configured to sequentially conduct the pair relationship determination for all combinations of two staying areas in the adjacency relationship.

According to this, the pair relationship determination between two staying areas may be repeated and thus, the group configuration determination for the users can be easily performed.

In a case where there is a chain of pair relationships which becomes a state where three or more staying areas are connected by the pair relationship, the processor may determine the group configuration as a group of three or more persons.

According to this, it is possible to determine the group of three or more persons by focusing on the chain of the pair relationships.

The processor is configured to aggregate stay information for each staying area and the determination result of the group configuration for each predetermined unit period. Accordingly, the processor is configured to generate statistical information relating to at least one of the quantity and the ratio for each group configuration for each unit period, as use information. As such, the processor is configured to generate display information displaying statistical information for each unit period by a table and a graph and output the display information.

According to this, a table or a graph of statistical information for each unit period relating to the quantity and the ratio for each group configuration is presented to the user. For that reason, the user can grasp how the use situation of the facility according to the group configuration the transition is being changed.

The facility use measuring system of the present embodiment determines a group configuration of users based on images obtained by photographing inside the facility and measures a use situation of the facility according to the group configuration. The facility use measuring system includes a camera for photographing inside the facility and a plurality of information processing devices each of which includes a processor and a memory storing instructions. Any one of the plurality of information processing devices executes the following matters as instructions stored in the memory by the processor. First, a plurality of staying areas for determining the presence or absence of stay of the user are set on the image. The processor is configured to generate stay information relating to the presence or absence of stay of the users of each staying area based on a change situation of an image in the staying area. Also, the processor is configured to compare pieces of stay information for every at least two staying areas and determine a group configuration regarding the users who respectively stay in staying areas based on similarity of the pieces of stay information. The processor is configured to generate use information relating to the use situation of the facility according to the group configuration, based on stay information for each staying area and a determination result of the group configuration. Furthermore, the processor is configured to generate display information displaying use information and output display information.

According to this, similar to the facility use measuring device by the present embodiment, the user can accurately determine the group configuration of the users in the facility in which positions at which the users stay are determined in advance.

INDUSTRIAL APPLICABILITY

The facility use measuring device and the facility use measuring system according to the present invention can accurately determine the group configuration of the users in the facility in which positions at which the users stay are determined in advance. For that reason, the facility use measuring device and the facility use measuring system are useful for use in determining the group configuration of the users based on the image obtained by photographing the inside the facility and measuring the use situation of the facility according to the group configuration.

REFERENCE MARKS IN THE DRAWINGS 1 camera
2 recorder
3 PC (facility use situation measuring device)
6 input device
7 monitor
8 printer
11 PC
12 cloud computer
13 smartphone
14 tablet terminal
21 area setting unit
22 stay information generator
23 group configuration determinator
24 use information generator
25 display information generator
31 area image acquisition unit
32 image change rate acquisition unit
33 stay determinator
34 pair relationship determinator
35 statistical processor

The invention claimed is:

1. A facility use measuring device that determines a group configuration of users based on images obtained by photographing inside a facility and measures a use situation of the facility according to the group configuration, the device comprising:
a processor; and
memory storing an instruction,
wherein the processor is configured to, as instructions stored in the memory,
set a plurality of staying areas for determining the presence or absence of stay of users on each of the images,
generate stay information relating to the presence or absence of stay of the users for each of the staying areas based on a change situation of each of the images in the staying areas,
compare the pieces of stay information for every at least two staying areas and determine the group configuration regarding the users who respectively stay in the staying areas based on similarity of the pieces of stay information,
generate use information relating to a use situation of the facility according to the group configuration, based on the stay information for each of the staying areas and a determination result of the group configuration, and
generate display information displaying the use information and output the display information,
wherein the processor is further configured to
acquire stay periods of the users for each of the staying areas,
compare the stay periods for each of the staying areas and determine the group configuration of the users based on an overlap rate of the stay periods, and acquire an image change rate of an image at each time having a predetermined sampling interval with respect to the image at the time of the immediately preceding sampling interval, determine the presence or absence of stay of the users for each of the staying areas based on continuity of the image change rate, and acquire the stay period for each of the staying areas.

2. The facility use measuring device of claim 1, wherein the processor is further configured to
separately determine groups of a single person, a pair, and three persons or more as the group configuration, and
generate information relating to a quantity for each group configuration, as the use information.

3. The facility use measuring device of claim 1, wherein the processor is further configured to
set a combination of two staying areas in an adjacency relationship, in which the users belonging to the same group stay adjacently, and
compare the pieces of stay information between the two staying areas in the adjacency relationship, perform a pair relationship determination of whether there is a pair relationship between the users who stay in the two staying areas or not, and sequentially conduct the pair relationship determination for all combinations of the two staying areas in the adjacency relationship.

4. The facility use measuring device of claim 3, wherein in a case where there is a chain of pair relationships, which becomes a state where three or more staying areas are connected by the pair relationship, the processor is configured to determine the group configuration as a group of three or more persons.

5. A facility use measuring device that determines a group configuration of users based on images obtained by photographing inside a facility and measures a use situation of the facility according to the group configuration, the device comprising:
a processor; and
memory storing an instruction,
wherein the processor is configured to, as instructions stored in the memory,
set a plurality of staying areas for determining the presence or absence of stay of users on each of the images,
generate stay information relating to the presence or absence of stay of the users for each of the staying areas based on a change situation of each of the images in the staying areas,
compare the pieces of stay information for every at least two staying areas and determine the group configuration regarding the users who respectively stay in the staying areas based on similarity of the pieces of stay information,
generate use information relating to a use situation of the facility according to the group configuration, based on the stay information for each of the staying areas and a determination result of the group configuration, and
generate display information displaying the use information and output the display information,
wherein the processor is further configured to
aggregate the stay information for each of the staying areas and the determination result of the group configuration for each predetermined unit period to generate statistical information relating to at least any one of a quantity and a ratio for each group configuration for each unit period, as the use information, and generate display information displaying at least any one of statistical information for each unit period by a table and a graph and output the display information.

6. A facility use measuring system that determines a group configuration of users based on images obtained by photographing inside a facility and measures a use situation of the facility according to the group configuration, the system comprising:

a camera for photographing inside the facility; and
a plurality of information processing devices each of which includes a processor and a memory storing instructions,
wherein in any one of the plurality of information processing devices, the processor is configured to, as instructions stored in the memory,
set a plurality of staying areas for determining the presence or absence of stay of the users on each of the images,
generate stay information relating to the presence or absence of stay of the users for each of the staying areas based on a change situation of each of the images in the staying areas,
compare the pieces of stay information for every at least two staying areas and determine the group configuration regarding the users who respectively stay in staying areas based on similarity of the pieces of stay information,
generate use information relating to a use situation of the facility according to the group configuration, based on the pieces of stay information for each of the staying areas and a determination result of the group configuration, and
generate display information displaying the use information and output the display information,
wherein the processor is further configured to
acquire stay periods of the users for each of the staying areas,
compare the stay periods for each of the staying areas and determine the group configuration of the users based on an overlap rate of the stay periods, and
acquire an image change rate of an image at each time having a predetermined sampling interval with respect to the image at the time of the immediately preceding sampling interval, determine the presence or absence of stay of the users for each of the staying areas based on continuity of the image change rate, and acquire the stay period for each of the staying areas.

7. A facility use measuring system that determines a group configuration of users based on images obtained by photographing inside a facility and measures a use situation of the facility according to the group configuration, the system comprising:

a camera for photographing inside the facility; and
a plurality of information processing devices each of which includes a processor and a memory storing instructions,
wherein in any one of the plurality of information processing devices, the processor is configured to, as instructions stored in the memory,
set a plurality of staying areas for determining the presence or absence of stay of the users on each of the images,
generate stay information relating to the presence or absence of stay of the users for each of the staying areas based on a change situation of each of the images in the staying areas,
compare the pieces of stay information for every at least two staying areas and determine the group configuration regarding the users who respectively stay in staying areas based on similarity of the pieces of stay information,
generate use information relating to a use situation of the facility according to the group configuration, based on the pieces of stay information for each of the staying areas and a determination result of the group configuration, and
generate display information displaying the use information and output the display information,
wherein the processor is further configured to
aggregate the stay information for each of the staying areas and the determination result of the group configuration for each predetermined unit period to generate statistical information relating to at least any one of a quantity and a ratio for each group configuration for each unit period, as the use information, and
generate display information displaying at least any one of statistical information for each unit period by a table and a graph and output the display information.

8. The facility use measuring device of claim 5, wherein the processor is further configured to
separately determine groups of a single person, a pair, and three persons or more as the group configuration, and
generate information relating to a quantity for each group configuration, as the use information.

9. The facility use measuring device of claim 5, wherein the processor is further configured to
set a combination of two staying areas in an adjacency relationship, in which the users belonging to the same group stay adjacently, and
compare the pieces of stay information between the two staying areas in the adjacency relationship, perform a pair relationship determination of whether there is a pair relationship between the users who stay in the two staying areas or not, and sequentially conduct the pair relationship determination for all combinations of the two staying areas in the adjacency relationship.

10. The facility use measuring device of claim 9, wherein in a case where there is a chain of pair relationships, which becomes a state where three or more staying areas are connected by the pair relationship, the processor is configured to determine the group configuration as a group of three or more persons.

* * * * *